United States Patent
Fussnegger

(10) Patent No.: US 9,023,931 B2
(45) Date of Patent: May 5, 2015

(54) OXIDATION-SENSITIVE, LOW-PEROXIDE POLYMER COMPRISING AT LEAST ONE INORGANIC PHOSPHORUS COMPOUND

(75) Inventor: Bernhard Fussnegger, St. Martin (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/444,005

(22) Filed: Apr. 11, 2012

(65) Prior Publication Data
US 2012/0261299 A1   Oct. 18, 2012

Related U.S. Application Data

(60) Provisional application No. 61/474,282, filed on Apr. 12, 2011.

(51) Int. Cl.
| | | |
|---|---|---|
| B65D 85/84 | (2006.01) | |
| B65B 31/00 | (2006.01) | |
| B65D 81/24 | (2006.01) | |
| C08L 39/06 | (2006.01) | |
| C08K 3/32 | (2006.01) | |
| B65D 81/20 | (2006.01) | |
| B65D 85/24 | (2006.01) | |
| C08K 3/00 | (2006.01) | |

(52) U.S. Cl.
CPC ............. B65D 85/84 (2013.01); C08L 39/06 (2013.01); C08K 3/00 (2013.01); B65D 81/2069 (2013.01); B65D 85/24 (2013.01)

(58) Field of Classification Search
CPC .......... C08L 39/06; C08K 3/00; B65D 81/24; B65D 81/266
USPC ....... 524/414; 206/524.1; 53/403; 514/772.5; 525/142, 182, 279
See application file for complete search history.

(56) References Cited

U.S. PATENT DOCUMENTS

| | | | |
|---|---|---|---|
| 2,821,519 | A | 1/1958 | Glickman |
| 3,277,066 | A | 10/1966 | Grosser et al. |
| 4,451,582 | A | 5/1984 | Denzinger et al. |
| 5,094,867 | A | 3/1992 | Detering et al. |
| 5,286,826 | A | 2/1994 | Shih et al. |
| 6,080,397 | A | 6/2000 | Pfirrmann |
| 6,239,206 | B1 | 5/2001 | Fussnegger et al. |
| 6,331,333 | B1 | 12/2001 | Wu et al. |
| 6,346,600 | B1 | 2/2002 | Tomihisa et al. |
| 6,498,231 | B2 | 12/2002 | Tomihisa et al. |
| 6,592,900 | B1 | 7/2003 | Buhler et al. |
| 7,786,233 | B2 | 8/2010 | Okamura |
| 8,524,827 | B2 | 9/2013 | Kolter et al. |
| 2001/0010825 | A1 | 8/2001 | Shimizu et al. |
| 2002/0058782 | A1* | 5/2002 | Tomihisa et al. ............. 528/501 |
| 2003/0125491 | A1 | 7/2003 | Meffert et al. |
| 2003/0168631 | A1* | 9/2003 | Otaki et al. ............. 252/188.28 |
| 2005/0143518 | A1* | 6/2005 | Eichenauer ..................... 525/67 |
| 2008/0139724 | A1 | 6/2008 | Kolter et al. |
| 2008/0181962 | A1 | 7/2008 | Brzeczko et al. |
| 2011/0158929 | A1 | 6/2011 | Kim et al. |
| 2011/0220534 | A1* | 9/2011 | Fussnegger et al. ....... 206/524.6 |
| 2011/0257339 | A1 | 10/2011 | Fischer et al. |

FOREIGN PATENT DOCUMENTS

| | | |
|---|---|---|
| CN | 1536018 A | 10/2004 |
| CN | 101115792 A | 1/2008 |
| CN | 101759969 A * | 6/2010 |
| CN | 101759969 A | 6/2010 |
| DE | 19547761 A1 | 6/1997 |
| DE | 10019470 A1 | 11/2000 |
| DE | 102005005974 A1 | 8/2006 |
| DE | 202009000692 U1 | 4/2009 |
| EP | 0088964 A2 | 9/1983 |
| EP | 0438713 A2 | 7/1991 |
| EP | 873130 A2 | 10/1998 |
| EP | 1083884 A1 | 3/2001 |
| EP | 1263813 A1 | 12/2002 |
| GB | 836831 A | 6/1960 |
| JP | 09-216653 A | 8/1997 |
| JP | 09-226070 A | 9/1997 |
| JP | 2000-44756 | 2/2000 |
| JP | 2002-3609 | 1/2002 |
| WO | WO-01/68727 A1 | 9/2001 |
| WO | WO-2006/015765 A1 | 2/2006 |
| WO | WO-2009/024457 A1 | 2/2009 |
| WO | WO-2010/052088 A1 | 5/2010 |
| WO | WO 2010052088 A1 * | 5/2010 |
| WO | WO-2010/072640 A1 | 7/2010 |

OTHER PUBLICATIONS

CN101759969A—machine translation.*
CN101759969A—machine translation—Mar. 13, 2014.*
International Search Report for PCT/IB2012/051734 dated Sep. 13, 2012.

* cited by examiner

Primary Examiner — Ling Choi
Assistant Examiner — Ronald Grinsted
(74) Attorney, Agent, or Firm — Drinker Biddle & Reath LLP

(57) ABSTRACT

Oxidation-sensitive, low-peroxide polymer contained in a sealed, protective-gas-filled packaging form, comprising, per kilogram of polymer solid, at least one inorganic phosphorus compound in amounts such that the total phosphorus content is $2*10^{-5}$ to 0.02 mol, and methods for stabilizing oxidation-sensitive polymer against peroxide formation, wherein, during or after the polymerization, at least one inorganic phosphorus compound is added in one or more portions in amounts such that the total phosphorus content per kilogram of polymer solid content of the finished polymer is $2*10^{-5}$ to 0.02 mol, and the polymer treated in such a way is placed into a protective-gas filled, sealed packaging form, and also use of these polymers.

16 Claims, No Drawings

OXIDATION-SENSITIVE, LOW-PEROXIDE POLYMER COMPRISING AT LEAST ONE INORGANIC PHOSPHORUS COMPOUND

CROSS-REFERENCE TO RELATED APPLICATIONS

This application claims benefit under 35 U.S.C. §119(e) of U.S. Provisional Patent App. Ser. No. 61/474,282, filed Apr. 12, 2011, which is incorporated herein by reference in its entirety.

The present invention relates to oxidation-sensitive, low-peroxide polymer comprising at least one inorganic phosphorus compound, a method for stabilizing such a polymer and its use.

Many oxidation-sensitive polymers such as crosslinked and uncrosslinked homo- and copolymers of N-vinylpyrrolidone are usually converted to pourable powders following their polymerization by spray-drying or drum-drying or another warm-air drying. In these processes, as a result of the intensive air contact and the heat, traces of peroxides are formed, the content of which increases still further in the course of the subsequent packaging, storage and handling. This tendency towards peroxide formation can present problems when using polymers such as polyvinylpyrrolidone (PVP and PVPP) in pharmaceutical preparations. In the current pharmacopeia, e.g. Ph. Eur. 7, the peroxide content for these polymers is limited to a maximum of 400 ppm. Through drying with the exclusion of air, storage at low temperatures and/or the hermetically sealed packaging under vacuum or an inert gas, the kinetics of peroxide formation can indeed be slowed, but not prevented. In addition, these processes are associated with a very high expenditure, meaning that the acceptance of such measures by the user is low. Moreover, it is the wish of pharmaceutical manufacturers to obtain polymers with even lower peroxide quantities, for example not more than 100 or even not more than 50 ppm, it being the intention then that these values are reliably not reached even in the event of the longest possible storage period.

Bühler writes in his book "Polyvinylpyrrolidone—Excipients for Pharmaceuticals", Springer, 2005, pages 33 and 34, that all types of povidones and crospovidones ("povidone" is the generic name for the soluble polyvinylpyrrolidone (PVP) in the pharmaceutical sector; "crospovidone" is the generic name for water-insolubly crosslinked PVP, which is also referred to as PVPP and polyvinylpyrrolidone-popcorn polymer) have a measurable growth in the peroxide content upon storage in the presence of atmospheric oxygen. This growth is reportedly particularly severe for the povidone with K value 90. Consequently, it is advisable to store products with these K values at low temperatures and/or hermetically sealed into aluminum-polyethylene double-layered film bags under a nitrogen atmosphere. Nevertheless, according to Bühler, the further increase in peroxide contents can only be slowed, but not stopped, thereby.

Moreover, such aluminum-polyethylene double-layered film bags are very expensive, and the aluminum layer can be easily damaged, as a result of which they largely lose the protective effect against the penetration of oxygen.

Bühler also reports on the color change in aqueous solutions of PVP, especially after storage or heating, for example during sterilization: the resulting yellow to brown-yellow coloration results from the oxidation by means of atmospheric oxygen. According to Bühler, this can be avoided by adding suitable antioxidants to the polymer (after its polymerization).

However, a disadvantage of adding such antioxidants is that the peroxides originating from the polymerization and also forming directly afterwards consume a larger amount of the antioxidants even upon their addition to the polymer and thus reduce the protection and the storage time. To compensate, relatively large amounts of antioxidant therefore have to be used.

The oxidation sensitivity of polymers such as PVP, the macroscopically visible and measurable effects of the oxidation and also proposed measures for containing and inhibiting the oxidation has been described in many publications (see for example Bühler in the publication detailed above; Kline in Modern Plastics, 1945, November, from page 157 onwards; EP-B 873 130).

It is known from U.S. Pat. No. 6,331,333 that polyvinylpyrrolidones are stored in the presence of an oxygen scavenger to prevent the formation of peroxide upon storage in oxygen-impermeable packagings. The oxygen scavengers used are ascorbic acid, iron powder or iron salts. Oxygen scavenger and polyvinylpyrrolidone are spatially separate here.

It is known from U.S. Pat. No. 6,498,231 that polyvinylpyrrolidones are mixed with an antioxidant for stabilization during storage and are stored under an atmosphere which comprises not more than 50 000 ppm of oxygen. The antioxidants used are, for example, phenolic or bisphenolic compounds, preferably thioamide or thiourea derivatives. However, such antioxidants are physiologically not entirely without risk and are completely unsuitable for the use of the polymers in pharmaceutical preparations.

EP 1263813 B1 discloses a process for popcorn polymerization with adjustment of the particle size of the popcorn polymers by means of passing through a stream of inert gas and/or adding reducing agents. In this case, a reducing agent can optionally be added in amounts of from 0.1 to 1% by weight, based on the monomer mixture, for achieving full freedom from oxygen in the reaction mixture. The reducing agents described are sodium sulfite, sodium pyrosulfite, sodium dithionite, ascorbic acid or mixtures of the reducing agents. In the examples, sodium dithionite was used in an amount of $2.2*(10$ to the power of $-7)$ to 1.9% by weight, based on the monomer mixture.

A reduction in peroxide content or a stabilization against peroxide build-up is neither specified as the aim nor otherwise mentioned as such in the entire specification.

A process for stabilizing PVP by means of adding hydrazine and derivatives thereof is known from U.S. Pat. No. 2,821,519.

However, hydrazines are toxicologically unacceptable and undesired in N-vinylpyrrolidone homo- and copolymers and polymers of N-vinylpyrrolidone derivatives.

EP-B1 083 884 describes a process for stabilizing polyvinylpyrrolidones against peroxide formation, in which aqueous solutions of the polymers are admixed with very small amounts of heavy metal salts or with peroxide-cleaving enzymes. These remain in the product. Suitable heavy metals are manganese, zinc, cobalt and in particular copper.

However, the use of the proposed heavy metals is disadvantageous on account of possible accumulation in the body. Moreover, the use of enzymes is disadvantageous for reasons of cost and stability.

GB 836,831 discloses a process for stabilizing polyvinylpyrrolidones against discolorations, in which solutions of the polymers are treated with sulfur dioxide, sulfurous acid or alkali metal sulfites.

It is known from DE-A 10 2005 005 974 that in the process known from GB 836,831, the peroxide build-up occurs after storage to an even greater extent than in the case of untreated polymers. DE-A 10 2005 005 974 therefore discloses a process in which the polyvinyl-pyrrolidones are treated firstly with sulfur dioxide, sulfurous acid or alkali metal salts thereof and then with a free-radical scavenger.

However, this process does not lead to the desired long-lasting effects with all polymers. For example, color and odor and peroxide content are not always satisfactory in the long term.

WO 2010/072640 discloses a process for the preparation of low-peroxide polymer comprising the treatment of the polymer with elemental metal in the presence of a liquid, and also a polymer obtainable by the process according to the invention with a peroxide content of less than 20 ppm based on the polymer solids content, where the peroxide content is determined two days after treatment by means of the titanyl sulfate method in accordance with European Pharmacopeia edition 7, and the polymer has not more than 5 ppm, based on the polymer solids content, of any precious metal and not more than 1000 ppm, based on the polymer solids content, of any nonprecious metal.

Alkali metals which dissolve in the polymer solution or suspension with the formation of hydrogen are used, or precious metals and gaseous hydrogen which is passed over these precious metals. The hydrogen here is intended to reduce the peroxides.

The use of gaseous hydrogen and/or hydrogen-forming metals that are reactive with water is a safety risk which should not be underestimated in an industrial plant and therefore signifies higher costs.

Antioxidants are sufficiently known to the skilled person in all areas of polymer chemistry. Usually, antioxidants are added to oxidation-sensitive substances in order to protect these against further oxidation, possibly by atmospheric oxygen (see for example R. E. King III. "Antioxidants (Overview)" and S. Al-Malaika "Antioxidants and Stabilizers" in Polymeric Materials Encyclopedia, Volume 1, Ed. J. C. Salamone, 1996).

Such a procedure is described for example in DE10019470 for stabilizing polyvinylpyrrolidones. In this, antioxidants are added and mixed in after the polymerization or a post-treatment following the polymerization and before optionally drying to give polymer powders. The amounts required for this are given as 0.00001 to 30% by weight, based on the polymer solids content. Specifically mentioned amounts used in the examples are 0.1% by weight of hydroquinone and also 0.5 and 1% by weight of another antioxidant, in each case based on the polymer solids content.

A disadvantage of the specified and specifically used substances from DE10019470 is that most of them are either not pharmaceutically suitable or are pharmaceutically suitable only to a very limited extent. Moreover, quite a few cause a sulfur odor or even react with customary drug active ingredients.

These substances likewise do not achieve an adequate reduction in peroxide content. In particular, no lowering, or only an inadequate lowering, of the peroxide values can be achieved with crosslinked, water-insoluble polymers. Inorganic phosphorus compounds are not mentioned.

U.S. Pat. No. 7,786,233 B2 already discloses the addition of antioxidant before, during or after the polymerization. However, the specification does not say any more about the action regarding "before" and "during" and also does not disclose any examples in this regard. The phosphorus-containing substances used are without exception organic phosphorus compounds which are known to a skilled person as typical antioxidants.

A further option for suppressing the autoxidation of oxidation-sensitive polymers is to store the polymers after workup in an oxygen-impermeable packaging.

EP-B 873 130 recommends spray drying polyvinylpyrrolidones to prevent the formation of peroxide under a nitrogen atmosphere and storing them in air-tight containers.

The packaging material used for oxidation-sensitive substances is also composite films made of polyethylene and aluminum. Although in principle such films have good barrier properties because they are essentially impermeable to oxygen, they have the disadvantage that during handling, mechanical damage to the barrier layer can in practice not be avoided, as a result of which the barrier property can be severely impaired. Even microcracks suffice to impair the oxygen impermeability of the films.

JP-A 09-226070, JP-A 2000-44756, JP-A 09-216653 or JP-A 2002-3609 disclose composite films with polyvinyl alcohol layers and their use for oxygen-impermeable packaging of foods, cosmetics, detergents, chemicals or fuel.

WO 2006/015765 discloses hose-shaped multilayer thermoplastic composite films for the packaging of foods.

WO 2010052088 discloses packaging forms made of multilayer films, the packaging of low-peroxide polymer and packaging methods.

It was an object of the present invention to stabilize an oxidation-sensitive, low-peroxide polymer permanently against the formation of peroxide without contaminating it with organic compounds such as antioxidants, enzymes or with metals and also without contaminating the polymer with odor- and color-forming substances such as sulfur compounds and nitrogen compounds. The polymer here should have very low to undetectable peroxide contents and at the same time increased stability to oxidation and renewed peroxide formation. Likewise, it should offer adequate protection against the formation of peroxide even in the event of short-term handling in air such as, for instance, the removal of the polymer from the packaging. It was a further aim that the polymers obtained should be suitable for contact with the human and/or animal body and its fluids. In particular, the polymers obtained should be pharmaceutically suitable to as unlimited a degree as possible, including oral or intravenous administration into the human and/or animal body. Likewise, contact with foods or plants which serve for nutrition or come into contact directly or in processed form with animals and/or humans, for example as foods or animal feed, should be possible without restrictions.

Accordingly, an oxidation-sensitive, low-peroxide polymer contained in a sealed, protective-gas-filled packaging form, comprising, per kilogram of polymer solid, at least one inorganic phosphorus compound in amounts such that the total phosphorus content is $2*10^{-5}$ to 0.02 mol, has been found.

A method for stabilizing oxidation-sensitive polymer against peroxide formation, wherein, during or after the polymerization, at least one inorganic phosphorus compound is added in one or more portions in amounts such that the total phosphorus content per kilogram of polymer solid content of the finished polymer is $2*10^{-5}$ to 0.02 mol, and the polymer treated in such a way is placed into a protective-gas-filled, sealed packaging form, has likewise been found.

Furthermore, the use of polymer according to the invention in cosmetic or pharmaceutical preparations, preparations of agrochemical active ingredients, preparations in the field of food, animal feed, food supplementation or animal feed supplementation, and for medical applications has been found.

Within the context of this invention, "inorganic phosphorus compound" (within the context of this invention also abbreviated and referred to synonymously as "phosphorus compound") means at least one oxo acid of phosphorus with phosphorus in oxidation states +1, +2, +3, +4 or mixed oxidation states, and also salts thereof. Accordingly, the use of individual acids, individual salts or mixtures of two or more different acids and/or salts is possible and encompassed by the invention.

"Oxo acids of phosphorus with phosphorus in oxidation states +1, +2, +3, +4 or mixed oxidation states" are the substances of this class known to the skilled person. These are for example acids and salts of ortho acids and diacids, meta acids and polyacids of phosphorus with phosphorus in oxidation states +1 to +4, where the phosphorus atoms in polynuclear acids/salts can also have different oxidation states ("mixed" oxidation states).

Examples of such substances are phosphinic acid (oxidation state of phosphorus: +1), phosphinates (+1) (obsolete name: "hypophosphites"), hypodiphosphonic acid (+2), hypodiphosphinates (+2), phosphonic acid (+3), phosphonates (+3) (obsolete name: phosphites), diphosphonic acid (+3), diphosphonates (+3), hypodiphosphoric acid (+4), hypodiphosphates (+4). Furthermore, these are the oligomeric derivatives (polyphosphoric acids) of all of these acids and salts in ring form ("metacids") or chain form, and mixed acids such as diphosphoric-(II,IV) acid and diphosphoric-(III,V) acid, and the salts of all of the aforementioned substances.

Within the context of this invention, as phosphorus compound, preference is given to one or more substances selected from phosphinic acid (oxidation stage of phosphorus: +1), phosphinate (+1), hypodiphosphonic acid (+2), hypodiphosphinate (+2), phosphonic acid (+3), phosphonate (+3), diphosphonic acid (+3) and diphosphonate (+3), and salts thereof.

Within the context of this invention, as "phosphorus compound", particular preference is given to one or more substances selected from phosphinic acid (oxidation stage of phosphorus: +1), phosphinate (+1), phosphonic acid (+3), phosphonate (+3), diphosphonic acid (+3) and diphosphonate (+3), and salts thereof.

As phosphorus compound, very particular preference is given to one or more substances selected from phosphinate (oxidation state of phosphorus: +1), phosphonate (+3) and diphosphonate (+3).

"Salts" of the oxo acids of phosphorus are ammonium salts and also all metal salts of metals which are pharmacologically acceptable for people and/or animals. The limit for the "pharmacological acceptability" accordingly gives the maximum amount of metal which must be present in the polymer. The allowable amount of metal in the polymer thus arises from the allowable daily dose of this metal and the allowable daily dose of polymer. The allowable amount of metal accordingly arises from the allowable amount of polymer per day and kg of bodyweight of person or animal (depending on the intended application and possible administration routes into the body): if, for example, 1 g of polymer solid and 1 mg of zinc are in each case allowable per day and if these maximum values are both to be utilized at the same time, then the maximum amount of zinc in the polymer can be at most a value of 0.1 percent or 100 ppm of zinc, based on polymer solid content. Accordingly, should an amount of metal salt be added to the polymer in order to achieve a desired stabilization in particular of the peroxide content, but which will reach or even exceed the maximum amount for this metal, then the skilled person can directly use mixtures of different metal salts in order to safely fall below these maximum amounts per metal.

Preferred salts are accordingly one or more pharmacologically acceptable metals selected from lithium, sodium, potassium, magnesium, calcium, zinc and iron and also ammonium. Particular preference is given to sodium, potassium, magnesium and/or calcium.

Very particular preference is given to sodium and/or potassium.

Sodium is especially preferred.

The polymers according to the invention comprise the phosphorus compound in amounts such that the total phosphorus content per kilogram of polymer solid is $2*10^{-5}$ (corresponding to "0.00002") to 0.02 mol.

For the method according to the invention for stabilizing the polymers according to the invention, the phosphorus compound is used in one or more portions in amounts such that the total phosphorus content per kilogram of polymer solid content of the finished polymer is $2*10^{-5}$ to 0.02 mol.

Preferably, the polymers comprise, per kilogram of polymer solid content of the finished polymer, 0.0005 to 0.01 mol, particularly preferably 0.001 to 0.005 mol and very particularly preferably from 0.0015 to 0.004 mol total phosphorus content.

"Total phosphorus content" refers to the fraction of phosphorus, calculated as elemental phosphorus, in the finished polymer solid. If, accordingly, an inorganic phosphorus compound is used which comprises one phosphorus atom per molecule, the molar amount of phosphorus, calculated as elemental phosphorus, accordingly corresponds to the molar amount of this molecule, for instance phosphinic acid.

Since the phosphorus content does not change without external influences even during polymer post-treatments, during drying of the polymer, during storage and handling, all phosphorus, added as inorganic phosphorus compound, accordingly remains in the polymer.

Accordingly, a phosphorus compound of oxidation state +5 is not added as "inorganic phosphorus compound".

Should, for example for changing the pH, a phosphorus compound of oxidation state +5, for example phosphoric acid or its salt phosphate be added to the polymer, the fraction of phosphorus resulting from this addition is not part of the "total phosphorus content" defined according to the invention.

In order to be able to state storage stabilities, a reference time point must be stated. Since the preparation of polymers and their packaging into sales containers are usually not more than 48 hours apart, the time point of 48 hours after the end of the polymerization is referred to within the context of this invention as "preparation".

A polymer according to the invention has a peroxide content determined at the time of the preparation of not more than 50 ppm, preferably not more than 20 ppm and particularly preferably not more than 10 ppm, such as, for example less than 5 ppm or less than 1 ppm of peroxides and/or a peroxide content determined at any desired time within up to three months after preparation of not more than 100 ppm, preferably not more than 50 ppm, particularly preferably not more than 20 ppm and very particularly preferably not more than 10 ppm, such as, for example, not more than 5 ppm or even not more than 1 ppm. Furthermore, the polymer according to the invention has residual monomer contents, for each of the monomers used, of not more than 100 ppm, preferably not more than 50 ppm, particularly preferably not more than 20 ppm, very particularly preferably not more than 10 ppm and in particular not more than 5 ppm, such as, for example, less than 1 ppm.

The peroxide content is determined here by means of the titanyl sulfate method in accordance with European Pharmacopeia edition 7. However, determination by means of the alternative method by means of iodometry as described in Ph. Eur. produces comparable values.

Since the inorganic phosphorus compound with oxidation states from +1 to +4 or mixed oxidation states used according to the invention can be oxidized by oxidizing agents, the oxidation state of the phosphorus compound according to the invention accordingly changes as a function of the amount and type of phosphorus compound, and also the amount of oxidizing agent relative to the amount of phosphorus compound.

The inorganic phosphorus compound can be detected in the polymer by means of customary analytical methods, for instance ICP-MS method (mass spectroscopy by means of inductively coupled plasma) to detect the content of, for example, phosphorus and sodium in a sample. Phosphinate, phosphate etc. can be determined via ion chromatography. Consequently, in a polymer sample, the content of alkali metals and of phosphorus compounds such as phosphinate, phosphonate and phosphate can be detected.

In principle, all oxidation-sensitive homopolymers and copolymers can be subjected to the process according to the invention for the stabilization of oxidation-sensitive, low-peroxide polymer.

Within the context of the invention, the term "polymer" comprises, for example, linear, water-solubly crosslinked and water-insolubly crosslinked polymers. The term "water-insolubly crosslinked polymer" also comprises the so-called popcorn polymers, which are referred to as "proliferous polymers" or, as in the case of polyvinylpyrrolidone, also as "PVPP". The preparation of such popcorn polymers takes place by the free-radical polymerization known as "popcorn polymerization" or "proliferous polymerization".

"Crosslinked" means polymer which, viewed from a statistical point of view, has at least one branching point per polymer chain. In this connection, despite its branching and irrespective of the number of branching points per polymer chain, a polymer may still be soluble in suitable solvents. "Crosslinked" means in particular a polymer which, on the basis of the number of branching points per polymer chain or its physical structure, is insoluble in all solvents.

Within the context of this invention, "water-insoluble" and "insoluble" means that the polymer has a solubility at 20° C. of less than 1 part of polymer in 100 parts of water or solvent.

"Polymer" comprises homopolymers, copolymers, graft homopolymers and graft copolymers which, in each case, may be present as linear, solubly crosslinked or insolubly crosslinked polymers, in particular water-insolubly crosslinked polymers.

Preference is given to using vinyllactam polymers. These vinyllactam polymers comprise, besides vinyllactam, also no, one or more monomers a), no, one or more monomers b) and also no, one or more crosslinking monomers c). This means the polymers have been obtained by polymerization of the specified monomers and can also comprise residual amounts of the monomers. Besides a vinyllactam homopolymer, vinyllactam polymer may therefore also be a vinyllactam copolymer of two or more different vinyllactams.

Suitable vinyllactams are, for example:
N-vinyllactams such as N-vinylpyrrolidone ("NVP", "VP"), N-vinylpiperidone, N-vinylcaprolactam ("VCap"), derivatives thereof substituted with C1 to C8-alkyl groups, such as 3-methyl-, 4-methyl- or 5-methyl-N-vinylpyrrolidone.

Preferred vinyllactams are N-vinylpyrrolidone, 3-methyl-N-vinylpyrrolidone, 4-methyl-N-vinylpyrrolidone, 5-methyl-N-vinylpyrrolidone, N-vinylpiperidone and N-vinylcaprolactam. Particularly preferred vinyllactams are N-vinylpyrrolidone and N-vinylcaprolactam. Very particular preference is given to N-vinylpyrrolidone.

Preferred vinyllactam polymers are vinylpyrrolidone polymers (polyvinylpyrrolidones), vinylpyrrolidone copolymers and vinyl pyrrolidone-popcorn polymers. Preferred vinyllactam copolymer comprising only vinyllactams comprises N-vinylpyrrolidone and N-vinylcaprolactam.

Suitable monomers a) are, for example:
N-vinylamides such as N-vinylformamide and the N-vinylamine thereof obtainable following polymerization by hydrolysis, N-vinyl-N-methylacetamide; amines such as N-vinyl- or allyl-substituted heterocyclic compounds, preferably N-vinylpyridine, or N-allylpyridine, N-vinylimidazoles, which may also be substituted in the 2, 4 or 5 position with C1-C4-alkyl, in particular methyl or phenyl radicals, such as 1-vinylimidazole, 1-vinyl-2-methylvinylimidazole, and quaternized analogs thereof, such as 3-methyl-1-vinylimidazolium chloride, 3-methyl-1-vinylimidazolium methylsulfate, N—C1- to C24-alkyl-substituted diallylamines or quaternized analogs thereof, such as diallylammonium chloride or diallyldimethylammonium chloride. Preferred monomers a) are vinylamides such as vinylformamide, and also the vinylamine obtainable by hydrolysis following polymerization, N-vinylimidazole, 1-vinyl-3-methylimidazoliumchloride, 1-vinyl-3-methylimidazoliumsulfate, and vinylmethylamide. Very particularly preferred monomers a) are vinylformamide and also the vinylamine obtainable by hydrolysis after the polymerization, and N-vinylimidazole.

Polymers according to the invention may accordingly also be copolymers of at least one vinyllactam and at least one monomer a), for example copolymers of N-vinylpyrrolidone and N-vinylimidazole, copolymers of N-vinylpyrrolidone and N-vinylformamide or copolymers of N-vinylpyrrolidone, N-vinylcaprolactam and N-vinylimidazole. Preferred copolymers are copolymers of N-vinylpyrrolidone and N-vinylimidazole.

Suitable monomers b) are all monomers referred to in WO 2010/072640 from page 6, line 8 to page 8, line 17 as monomers b), to which reference is expressly made here.

Preferred monomers b) are maleic acid, maleic anhydride, isopropylmethacrylamide, acrylamide, methacrylamide, isopropylacrylamide, N-tert-butylacrylamide, 2-hydroxyethyl (meth)acrylamide and 2-hydroxyethylethylacrylamide, also vinyl esters of aliphatic C2-C18-carboxylic acids, such as vinyl acetate, and also the vinyl alcohol obtainable therefrom by hydrolysis after the polymerization, vinyl propionate, vinyl butyrate, vinyl laurate, vinyl stearate, vinyl neonate "VEOVA 9" and vinyl neodecanoate "VEOVA 10", also dimethylamino(m)ethyl (meth)acrylate and dimethylamino(m)ethyl(meth)acrylamide and quaternized analogs thereof, and/or diallyldimethylammonium chloride.

The term "(m)ethyl (meth)acrylate" and variants thereof comprising only "(m)" or "(meth)" within the context of this invention means "methyl acrylate", "ethyl acrylate", "methyl methacrylate" and "ethyl methacrylate". Derivatives comprising "(m)ethyl (meth)acrylate" arise analogously therefrom.

Particularly preferred monomers b) are methacrylamide, vinyl acetate, and also the vinyl alcohol obtainable by hydrolysis after the polymerization, vinyl propionate, vinyl neonoate VEOVA 9 and vinyl neodecanoate VEOVA 10, dimethylamino(m)ethyl(meth)acrylate, dimethylamino(m)ethyl (meth)acrylamide and quaternized analogs thereof, and/or diallyldimethylammonium chloride.

Very particular preference is given to vinyl acetate and/or vinyl alcohol as monomers b). In particular, preference is given to vinyl acetate.

Polymers which are copolymers and comprise monomers b) can comprise one or more of the monomers b). Usually, however, not more than five different monomers b) are present in one copolymer.

Preferred polymers further include copolymers which comprise at least one vinyllactam, at least one monomer a) and at least one monomer b).

Polymers according to the invention can accordingly also be copolymers of N-vinylpyrrolidone and vinyl acetate, copolymers of N-vinylpyrrolidone, vinylcaprolactam and vinyl acetate or copolymers of N-vinylcaprolactam and vinyl acetate.

Suitable crosslinking monomers c) ("crosslinkers") are all those described in WO 2009/024457 on page 7, line 1 to page 9, line 2, to which reference is expressly made here.

Preferred crosslinking monomers c) are pentaerythritol triallyl ether, methylene bisacrylamide, N,N'-divinylethylene urea, N,N'-divinylpropylene urea, divinylbenzene, ethylidene bis-3-(N-vinylpyrrolidone), 1-vinyl-3-ethylidene pyrrolidone, 3-vinyl-N-vinylpyrrolidone, 4-vinyl-N-vinylpyrrolidone, 5-vinyl-N-vinylpyrrolidone, allyl(meth)acrylate, triallylamine, acrylic acid esters of glycol, butanediol, trimethylolpropane and glycerol, acrylic acid esters of glycol, butanediol, trimethylolpropane or glycerol reacted with ethylene oxide and/or epichlorohydrin, and mixtures of the aforementioned substances.

Crosslinking monomers c) preferred for the use for the so-called popcorn polymerization (proliferous polymerization) are N,N'-divinylethylene urea, ethylidene bis-3-(N-vinyl pyrrolidone), 1-vinyl-3-ethylidene pyrrolidone, 3-vinyl-N-vinylpyrrolidone, 4-vinyl-N-vinylpyrrolidone, 5-vinyl-N-vinylpyrrolidone, and mixtures of the aforementioned substances, of which very particular preference is given to N,N'-divinylethylene urea.

The vinyllactams, monomers a), b) and c) used for the polymerization, can be, independently of one another, a single or mixtures of two or more vinyllactams, two or more monomers a), b) and/or c), where the respective combined quantitative fraction of the vinyllactams, monomers a), b) or c) gives the quantitative fraction specified in each case for vinyllactam, monomer a), for monomer b) and for monomer c), respectively, in the polymer.

The quantitative fractions in percent by weight based on the total mass of the polymer are here for vinyllactams usually at least 20% by weight, preferably at least 30% by weight, particularly preferably at least 50% by weight, very particularly preferably at least 60% by weight and in particular at least 97% by weight, such as, for example, homopolymers of 100% of a vinyllactam or polymers of for example 98% by weight of vinyllactam and 2% by weight of monomer c).

The quantitative fractions in percent by weight based on the total mass of the polymer are here for monomers a) and the monomers b), independently of one another, usually up to 80% by weight, preferably up to 70% by weight, particularly preferably up to 50% by weight, very particularly preferably up to 40% by weight and in particular up to 20% by weight and are, for example, not present at all in the polymer.

The total amounts of vinyllactam, monomer a), monomer b) and monomer c) always add up here to 100% by weight based on the polymer.

If the polymer is water-solubly crosslinked polymer, the quantitative fractions of the crosslinking monomers c) in percent by weight based on the total mass of the polymer are usually 0.001 to 20% by weight, preferably 0.01 to 10% by weight, particularly preferably 0.05 to 5% by weight and very particularly preferably 0.1 to 1% by weight.

If the polymer is water-insolubly crosslinked popcorn polymer, the quantitative fractions of the crosslinking monomers c) in percent by weight based on the total mass of the polymer are usually 0.001 to 10% by weight, preferably 0.01 to 5% by weight, particularly preferably 0.1 to 4% by weight and very particularly preferably 0.5 to 2.5% by weight, such as, for example, 1.4 to 2.3% by weight.

Thus, for example, a typical popcorn polymer comprises vinyllactam, for instance in the case of a preferred water-insolubly crosslinked polyvinylpyrrolidone, only vinylpyrrolidone, in the quantitative fraction from 95 to 99.8% by weight, preferably 97.5 to 99.5% by weight, and also a crosslinking monomer c) in the quantitative fraction from 0.2 to 5% by weight, preferably 0.5 to 2.5% by weight, for example 98.1% by weight vinyllactam and 1.9% by weight monomer c), where, in the case of water-insolubly crosslinked polyvinylpyrrolidone, N,N'-divinylethyleneurea is particularly preferred as monomer c).

Polyvinylpyrrolidones are, for example, polymers with K values from 10 to 200, preferably K15 to K150, for example 15, 17, 25, 30, 60, 85, 90, 95, 100, 115 or K120.

The K value is a measure of the molar mass and is determined via the solution viscosity of an aqueous solution with defined polymer concentration (see Volker Bühler in "polyvinylpyrrolidone excipients for the pharmaceutical industry", 9th revised edition, BASF, page 26 to 29). It can only be determined for polymers which have adequate solubility in water.

Vinylpyrrolidone copolymers are, for example, copolymers with N-vinylcaprolactam (Vcap), vinyl acetate (VAc), N-vinylimidazole (VI) or mixtures thereof, such as copolymers of N-vinylpyrrolidone (VP) and vinyl acetate having a VP/VAc weight ratio of from 20:80 to 80:20, for example 30:70, 50:50, 60:40, 70:30, with K values of from 10 to 150, preferably from 15 to 80 and particularly preferably from 20 to 50. Particularly preferred copolymers of N-vinylpyrrolidone and vinyl acetate have a K value of from 25 to 60 and a VP to VAc weight ratio of from 55:45 to 70:30, such as, for example, 60:40, 50:50 and 65:35. Further preferred copolymers are copolymers of VP and VI, and copolymers of VP and VCap in each case with K values of from 15 to 150, preferably from 20 to 100 and in particular from 30 to 90, and also weight ratios of the monomes VP to VI or VP to VCap of from 80:20 to 20:80, preferably from 70:30 to 30:70, particularly preferably from 60:40 to 40:60 and for example also 50:50.

The preparation of vinyllactam polymers by free-radical polymerization with or without using crosslinking monomers c) is known per se. The polymerization here produces linear or crosslinked polymers which, depending on monomer solubility and optionally on the number of crosslinking points and/or the physical structure (the arrangement of the polymer chains three-dimensionally), are water-soluble, gel-forming in water or insoluble in water.

The preparation of polyvinylpyrrolidones can take place for example as solution polymerization or precipitation polymerization in a suitable solvent such as water, mixtures of water and organic solvents, for example ethanol/water or isopropanol/water mixtures or in purely organic solvents such as methanol, ethanol or isopropanol. These preparation methods are known to the skilled person.

Preferred water-insolubly crosslinked polymers are polymers of vinylpyrrolidone or polymers of vinylpyrrolidone and/or vinylcaprolactam with vinylimidazole and/or vinyl acetate which have been prepared by means of the so-called "popcorn" polymerization (also referred to as proliferous polymerization), for which reason the polymers are also referred to as "proliferous polymer". Water-insolubly crosslinked N-vinylpyrrolidone homopolymers are also referred to as "PVPP" or—in the pharmaceutical sector—as "crospovidone".

Popcorn polymerization and popcorn polymers are described for example by Barabas in Encyclopedia of Polymer Science and Engineering, Second Edition, Volume 17, 1989, page 212, 3rd paragraph to page 213, 3rd paragraph, or Haaf, Sanner and Straub, Polymer Journal 1985, Vol. 17, No. 1, pages 143 to 152; especially on pages 148 to 151.

The crosslinkers used for preparing popcorn polymers are formed in situ by a reaction or reaction step prior to the actual polymerization reaction or are added as a defined compound (see Haaf et al.).

In the case of such popcorn polymers, accordingly, a determination of the molar mass is not possible because popcorn polymers are virtually insoluble in all solvents. All customary methods, however, are based on an at least slight solubility of the polymers and are therefore unsuitable for popcorn polymers.

The preparation of popcorn polymers contemplated according to the invention, such as, in particular, water-insolubly crosslinked polyvinylpyrrolidone (PVPP) with the addition of crosslinkers is described for example also in EP-A 88964, EP-A 438 713 or WO 2001/068727. The preparation of popcorn polymers such as PVPP by generating crosslinkers in situ in a reaction prior to the actual popcorn polymerization and their polymerization with the specified monomers to yield crosslinked, water-insoluble popcorn polymers is known, for example, also from U.S. Pat. No. 3,277,066 or U.S. Pat. No. 5,286,826. Preferably, such a generation of the crosslinker from the monomer takes place here in the presence of a strong base.

Both preparation variants are suitable for the present invention and are therefore embodiments according to the invention.

Preferably, the preparation according to the present invention, however, takes place by the first-mentioned method with the addition of crosslinkers.

Preferred popcorn polymers are obtained from in situ prepared crosslinker and N-vinylpyrrolidone, N-vinylimidazole, N-vinylcaprolactam and/or N-vinyl acetate.

Particularly preferred popcorn polymers are obtained using divinylethylene urea as crosslinking monomer c) and N-vinylpyrrolidone and/or N-vinylcaprolactam as vinyllactams, and optionally N-vinylimidazole and/or N-vinyl acetate as monomers a). The quantitative ratios VP to VI here in the case of a VP/VI popcorn polymer are 0.5:9.5 up to 5:5, preferably 1:9.

Very particularly preferred popcorn polymers are obtained from N,N'-divinylethylene urea and N-vinylpyrrolidone or from N,N'-divinylethyleneurea, N-vinylpyrrolidone and N-vinylimidazole.

In particular, popcorn polymers of N,N'-divinylethyleneurea and N-vinylpyrrolidone are preferred.

The quantitative fractions of the crosslinker in the entire monomers are here in each case 0.5 to 3% by weight, preferably 1.4 to 2.3% by weight and very particularly preferably 1.9 to 2.1% by weight.

Water-insolubly crosslinked polymers (popcorn polymers) are also commercially available, for example as Kollidon® CL, Kollidon® CL-F or Kollidon® CL-SF, and, as micronized product, Kollidon® CL-M from BASF SE, or as Polyplasdone® XL, Polyplasdone® XL-10 or Polyplasdone® INF-10 from ISP Corp., USA (all trade names belong to the field of pharmaceutical applications). Further known trade names are Divergan® from BASF and Polyclar® from ISP.

Popcorn polymers which comprise N-vinylpyrrolidone and N-vinylimidazole in the weight ratio 1:9 are also commercially available for example as Divergan® HM from BASF SE.

The polymers are obtained by the polymerization of the stated monomers and can therefore also comprise residual amounts of these monomers. Customary residual amounts are for example not more than 100 ppm of one or all monomers based on the polymer solids content. Preference is given to polyvinylpyrrolidones, and very particular preference is given to water-insolubly crosslinked polyvinylpyrrolidone popcorn polymers which comprise not more than 100 ppm, preferably not more than 50 ppm, particularly preferably not more than 10 ppm, very particularly preferably not more than 5 ppm and in particular not more than 1 ppm, of N-vinylpyrrolidone or residual monomer, depending on the monomer used, based on the polymer solids content.

If these residual amounts of monomers are not obtained directly by the polymerization, suitable measures are known to the skilled person for lowering the monomer contents. Methods that are customary and can be used for the polymers are, for example, thermal distillation, steam distillation, stripping, adsorption and, in the case of water-insolubly crosslinked polymers such as popcorn polymers, also, for instance, washing.

Preferably, the polymers are obtained without the use of such measures. In the case of popcorn polymers, preferably only washing takes place.

Within the context of this invention, of all of the aforementioned polymers, particular preference is given to the polyvinylpyrrolidones and the water-insolubly crosslinked vinylpyrrolidone polymers and very particular preference is given to the water-insolubly crosslinked polyvinylpyrrolidone polymers such as polyvinylpyrrolidone popcorn polymers.

Polymers comprising inorganic phosphorus compound that are particularly preferred according to the present invention are accordingly the polyvinylpyrrolidones having K values of 10 to 200, preferably K15 to K150, for example 15, 17, 25, 30, 60, 85, 90, 95, 100, 115 or K120, and polymers that are very particularly preferred are the water-insolubly crosslinked, low-peroxide vinylpyrrolidone polymers of 0.5 to 2.5% by weight of N,N'-divinylethylene urea and 97.5 to 99.5% by weight of N-vinylpyrrolidone which—in each case based on the polymer solids content—have a peroxide content determined at the time of the preparation of not more than 50 ppm, preferably not more than 20 ppm and particularly preferably not more than 10 ppm and/or a peroxide content determined at any desired time within up to three months following preparation of not more than 100 ppm, preferably not more than 50 ppm and particularly preferably of not more than 20 ppm, such as, for example, less than 10 ppm or even less than ppm. The peroxide content here is determined by means of the titanyl sulfate method in accordance with European Pharmacopeia edition 7. These vinyllactam polymers, based on the polymer solids content—likewise have residual monomer contents, for each of the monomers used, of not more than 100 ppm, preferably not more than 50 ppm, particularly preferably not more than 20 ppm, very particularly preferably not more than 10 ppm and in particular not more than 5 ppm, such as, for example, less than 1 ppm.

The method according to the invention for the stabilization of oxidation-sensitive, low-peroxide polymer against peroxide formation is one wherein, during or after the polymerization, at least one inorganic phosphorus compound is added in one or more portions in amounts such that the total phosphorus content per kilogram of polymer solid content of the finished polymer is $2*10^{-5}$ to 0.02 mol, and the polymer treated in such a way is placed into a protective-gas-filled, sealed packaging form. In a preferred embodiment of the method, the protective gas has less than 0.5% by volume of oxygen.

In a further preferred embodiment of the method, the inorganic phosphorus compound is selected from the group of the oxo acids of phosphorus with phosphorus in oxidation states +1, +2, +3, +4 or mixed oxidation states, and salts thereof.

In a further preferred embodiment of the method, the polymer is selected from (i) homopolymers and copolymers of N-vinyl compounds, water-soluble or water-insolubly crosslinked homopolymers and copolymers of N-vinylpyrrolidone, N-vinylpyrrolidone-vinyl acetate copolymers, (ii) mixtures of two or more of these polymers or (iii) mixtures comprising one or more of these polymers.

These preferred embodiments can of course be combined with one another as desired. In one particularly preferred embodiment, these three preferred embodiments are combined.

In one embodiment of the method, the phosphorus compound is added at a time at which the polymerization is at least 90% complete, preferably at least 95% complete, particularly preferably at least 98% complete and very particularly preferably at least 99.9% complete, for example 99.99% or even complete conversion has been reached. The conversion refers here always to the polymerizable constituents in the reaction mixture, i.e. the vinyllactams, monomers a), b) and c), if used for the polymerization.

In a further embodiment of the method, the phosphorus compound is only added after the end of the polymerization, after the end of a subsequent post-polymerization or after the end of a subsequent post-treatment such as acidic hydrolysis, stripping, steam distillation or thermal distillation. The latest time for the addition is after bottling a polymer solution or polymer suspension to the bottled polymer product in the packaging form. If a drying of the resulting polymer solution or polymer suspension to give a solid polymer is envisaged, then the addition of the phosphorus compound takes place at the latest during drying, for example as addition during spray drying.

If a polymer solution or polymer suspension is desired as end product, preference is given to the addition after the end of all post-treatments and before bottling. Consequently, good mixing with the polymer can be achieved, for example by mixing in or as a result of turbulences while pouring into the packaging form.

If solid polymer is desired as end product, the addition to the solution or suspension to be dried directly prior to drying is preferred, so that the phosphorus compound is evenly distributed in the solution or suspension.

The process for the preparation of the polymer takes place by customary preparation methods, in the case of vinyl monomers usually by polymerization in water, organic solvent or mixtures thereof, but can also be carried out in the absence of solvents as bulk polymerization. Depending on the solubility of the monomers, however, a suspension, emulsion or precipitation polymerization is also possible.

Typical representatives of the organic solvents are, for example, C1- to C8-alcohols, such as methanol, ethanol, n-propanol, isopropanol, butanol, glycol, glycerol, diethyl ether. Preference is given to using methanol, ethanol and/or isopropanol.

Water may be water of varying quality: water of technical-grade quality, water of naturally occurring quality such as surface water, river water or groundwater, and also purified water. Purified ("pure") water can be purified by purification methods such as single or multiple distillation, demineralization, diffusion, adsorption, by means of ion exchangers and also activated carbons or other absorbents, by means of a filtration method such as ultrafiltration or dialysis. Purified water is the term usually used here to refer to singly or multiply distilled water and also completely demineralized water.

Preference is given to using organic solvents, water or mixtures thereof. Very particular preference is given to the use of predominantly water, in particular of purified water.

The polymerization generally takes place as free-radical polymerization, in most cases initiated by adding radical-forming substances. By contrast, the so-called popcorn polymerization generally takes place spontaneously without the addition of such substances.

The polymerization can be started here by means of all methods known to the skilled person, for example by adding radical formers such as azo initiators, peroxides, redox systems and also UV light and/or radiation. Preference is given to the addition of radical formers, in particular of azo initiators, organic peroxides and/or hydrogen peroxide.

The preparation takes place in the case of the soluble crosslinked polymers preferably in solution, in the case of water-soluble crosslinked polymers particularly preferably in aqueous solution. In the case of the insolubly crosslinked polymers, such as the polyvinylpyrrolidone popcorn polymers, the preparation takes place without a diluent or as precipitation polymerization. In the case of the precipitation polymerization, starting from an aqueous solution or dispersion of the monomers, a polymer dispersion (in most cases a suspension) in water is obtained. Preferably, in the case of the water-insoluble crosslinked polyvinyl pyrrolidone popcorn polymers, their preparation is by means of precipitation polymerization ("popcorn polymerization") in purified water.

Suitable preparation methods for the popcorn polymers according to the invention are described in particular in EP1263813 B1 (entire document) and in DE 19547761 A1 (page 2, line 61 to page 3, line 29 and example 1a), to which reference is expressly made here.

Further suitable preparation instructions can be found in EP-A 88964, EP-A 438 713 or WO 2001/068727 and also U.S. Pat. No. 3,277,066 and U.S. Pat. No. 5,286,826.

Use of the process known from EP 1263813 B1 for popcorn polymerization with adjustment of the particle size of the popcorn polymers by means of a stream of inert gas and/or reducing agent, the process steps of which are described in paragraphs [0011], [0019] to [0025] and also the examples, to which reference is made here in its entirety, is likewise possible and encompassed by the present invention.

Suitable reaction vessels are all vessels suitable for such reactions known to the skilled person, such as stirred reactors, tubular reactors, extruders, kneaders or fluidized-bed reactors. Preferably, the precipitation polymerization takes place in stirred reactors. The bulk polymerization preferably takes place in stirred reactors or kneaders.

The polymer solutions or dispersions prepared usually have a solids content of from 5 to 80% by weight, preferably 5 to 60% by weight. In the case of dispersions, the solids content is particularly preferably 5 to 25% by weight and in particular 8 to 15% by weight.

Particular preference is given to using those amounts of phosphorus compound such that in the polymer following the preparation, only those amounts remain such that the total ash content (also called residue on ignition) and the maximum content amount of phosphorus compound (when using two or more substances as phosphorus compound, the respective content amount refers to each individual substance) and the total phosphorus content satisfies the particular requirements according to the "relevant regulations".

Such "relevant regulations" governing the maximum ash contents and the content amount limits for certain substances for the respective polymers are known to the skilled person in the respective field of application. Regulations relevant in the pharmaceutical sector are, for example, the European Pharmacopeia (Ph. Eur.), the Japanese Pharmacopeia for Excipients (JPE), the US-American Pharmacopeia (USP) or the German Pharmacopeia (DAB) in their most current valid version in each case. Regulations relevant to the food sector are, for example, those issued by the Food and Drug Administration (FDA) in the USA or those arising from German food legislation.

The skilled person in the particular field of work therefore knows which particular regulations must be deemed relevant for the application and can therefore directly establish what upper limit for the total ash content and which upper limits for substances and substance classes exist and are to be observed.

In the specific case of exercising the present invention, the skilled person will ascertain, usually by reference to the relevant regulations, firstly the permissible total ash content and the particular upper limits for the respective polymer and then calculate the permissible amount of the individual phosphorus compound and the total phosphorus content. Likewise, he will determine by generally known methods the actual total ash content and the respective content amount of the polymer without the treatment. From the difference in contents without the treatment and the permissible upper limits according to the relevant regulations, a skilled person can directly calculate the maximum addition amount of phosphorus compound for this polymer. Usually, for the addition amount, he will establish a safety margin of about 5 to 10% based on the maximum addition amount in order to be able to take into consideration fluctuations in production. It is easy for a person skilled in the field to determine the normal variations in the chosen process and then set an appropriate safety margin for this process.

According to the invention, after the polymerization, reducing agent and/or antioxidant can additionally be added to the low-peroxide polymer. As a result, the stability against oxidation and/or further peroxide formation can be again improved.

"Antioxidant" may be an individual compound or a mixture of two or more antioxidants. Such compounds are also referred to as free-radical scavengers and, within the context of this invention, encompassed by the term "antioxidant".

"Reducing agent" may be an individual compound or a mixture of two or more reducing agents. If reducing agents and further antioxidant are used, this addition can take place in parallel or sequentially. Preferably, the addition takes place sequentially. Particularly preferably, firstly the addition of reducing agent takes place and then the addition of further antioxidant.

If reducing agents are added, the addition thereof takes place prior to the addition of the phosphorus compound. If antioxidant is used, the addition thereof takes place prior to or after the addition of the phosphorus compound, preferably afterwards.

Reducing agent and/or antioxidant and phosphorus compound can be added to the polymer, which is present in liquid, in solid form, dispersed or dissolved in a suitable solvent. A preferred solvent is the same as the liquid used in each case for the preparation. Particular preference is given to water.

The addition of phosphorus compound and optionally reducing agent and/or antioxidant generally takes place at temperatures of from 10 to 100° C., preferably 15 to 80° C. and particularly preferably 20 to 60° C. The preferred pH range for the addition is 3 to 11, preferably 5 to 10, particularly preferably 6 to 9.

If reducing agent is used, after the addition of reducing agent, a waiting time generally follows, expediently at elevated temperature. Within this waiting time, the polymer solution or dispersion is kept at elevated temperature from 20 to 90° C., preferably at 40 to 80° C., and preferably thoroughly mixed. This waiting time usually lasts a few minutes up to several hours, preferably at least 5 minutes, particularly preferably at least 30 minutes and very particularly preferably at least 60 minutes, but usually not longer than 4 hours, preferably not longer than 2 hours.

The addition of phosphorus compound is optionally followed by a further waiting time, preferably likewise with thorough mixing. This further waiting time after adding phosphorus compound usually lasts a few minutes up to several hours, preferably at least 5 minutes, particularly preferably at least 10 minutes and very particularly preferably at least 15 minutes, but is usually not more than 2 hours and preferably not more than 1 hour.

The optional addition of antioxidant is optionally followed by a further waiting time, preferably likewise with thorough mixing. This further waiting time after adding antioxidant usually lasts a few minutes up to several hours, preferably at least 5 minutes, particularly preferably at least 15 minutes and very particularly preferably at least 30 minutes, but is usually not more than 2 hours and preferably not more than 1 hour.

As the volume of polymer solution or dispersion increases, so too does the waiting time period after adding reducing agent, phosphorus compound and antioxidant in each case. The specified times are already suitable for commercial production in a stirred reactor in a scale of several tonnes of polymer.

An adaptation to other processes is therefore readily possible for a skilled person. It should be taken into consideration here that a significant increase in the waiting time following the addition of phosphorus compound and optional antioxidant generally does not bring about a noteworthy effect. In this connection it is merely necessary—as of course also in the case of mixing in reducing agents—to ensure thorough mixing with the polymer and uniform distribution within the polymer.

Reducing agents in the context of this invention are sulfur dioxide, sulfurous acid or sulfites, preferably alkali metal or alkaline earth metal sulfites, for example potassium sulfite, potassium hydrogen sulfite, lithium sulfite, lithium hydrogen sulfite, sodium sulfite or sodium hydrogen sulfite, and ammonium sulfite and ammonium hydrogen sulfite, particular preference being given to sodium sulfite, sodium hydrogen sulfite and sulfur dioxide. Very particular preference is given to sulfur dioxide as aqueous solution.

If reducing agent and/or antioxidant are to be used, then even small amounts suffice. Reducing agent can be used, for example, in amounts of from 0.005 to 1% by weight, based on solid polymer, preferably at least 0.01% by weight and particularly preferably at least 0.03% by weight, preferably up to 0.5% by weight and particularly preferably up to 0.20% by weight. Antioxidant can be used, for example, in amounts of from 0.01 to 1% by weight, based on solid polymer, preferably at least 0.03% by weight and particularly preferably at least 0.05% by weight, preferably up to 0.5% by weight and particularly preferably up to 0.25% by weight.

Suitable antioxidant which can be used according to the invention is known, for example, as antioxidant from WO2010/072640 on page 25, to which reference is expressly made here. Suitable as antioxidant are therefore, for example: ascorbic acid, erythorbic acid, nordihydroguaiaretic acid, ethoxyquin, bisabolol, ascorbyl palmitate or BHT ("butylhydroxy-toluene": 2,6-di-tertiary-butyl-4-methylphenol), derivatives and salts of these substances or mixtures of the aforementioned substances.

It is also possible, for example, to use ammonium, alkali metal, alkaline earth metal salts of, for instance, ascorbic acid, such as ammonium ascorbate, sodium ascorbate or magnesium ascorbate or mixtures thereof. Esters of, for example, ascorbic acid with inorganic or organic acids, such as ascorbyl carbonate, ascorbyl phosphate, ascorbyl sulfate, ascorbyl stearate or ascorbyl palmitate, and also the ammonium, alkali metal, alkaline earth metal salts thereof, for example sodium ascorbyl phosphate or sodium ascorbyl palmitate, are likewise suitable. The analogous compounds of erythorbic acid can likewise be used. Mixtures of all of the aforementioned compounds can likewise be used.

As antioxidant, preference is given to using ascorbic acid, erythorbic acid, alkali metal, alkaline earth metal or ammonium salts of these acids, derivatives thereof, such as esters, ethers or amides or mixtures of the aforementioned substances. Particular preference is given to using ascorbic acid or erythorbic acid, and very particular preference is given to using just ascorbic acid.

When using reducing agent and antioxidant, particular preference is given to using sulfur dioxide as reducing agent and ascorbic acid and/or erythorbic acid as further antioxidant, in particular just sulfur dioxide and ascorbic acid.

It is particularly preferred in the process according to the invention to use phosphorus compound and antioxidant, without use of reducing agent.

It is very particularly preferred in the process according to the invention to use phosphorus compound, without use of reducing agent and without antioxidant.

Accordingly, the polymer according to the invention particularly preferably comprises only phosphorus compound and antioxidant and no reducing agent.

The polymer according to the invention accordingly very particularly preferably comprises only phosphorus compound and no antioxidant and no reducing agent.

The addition of phosphorus compound, optional reducing agent and optional antioxidant takes place in each case preferably with thorough mixing such as stirring. Mixing by blowing in a gas, for example a protective gas, or by circulating by pumping with and without static mixers is also possible, as are combinations of two or more methods for thorough mixing.

The polymerization may, but does not have to be, followed by a post-polymerization. For the post-polymerization, free-radical former (initiator) can be added, for instance. All initiators known to the skilled person are suitable in principle. For the post-polymerization in the case of a popcorn polymerization, preference is given to water-soluble azo initiators, the decomposition products of which are not prohibitive for the planned use of the polymer, i.e. for example do not cause clouding, odor or toxicity.

It is also possible, optionally also additionally after a post-polymerization, to carry out a chemical post-treatment such as an acidic or basic hydrolysis for reducing residual monomer, for instance. Furthermore, a physical post-treatment is possible, such as distillation, steam distillation and/or stripping.

After the polymerization and possible subsequent post-treatment, water-insolubly crosslinked popcorn polymer such as in particular PVPP is usually separated off from the solvent, in most cases by filtering. This is usually followed by washing one or more times, generally with purified water such as distilled water. Then, in most cases, the water content is reduced by, for instance, pressing the polymer.

Since the amount of phosphorus compound and optional antioxidant and also optional reducing agent remaining in the polymer may be lower as a result of the washing, the amount of phosphorus compound and optional antioxidant and optional reducing agent in the polymer can be ascertained directly before drying and after washing and squeezing by means of a simple determination.

If the amount remaining in the polymer for the drying is lower than desired, through repeated adjustment of the amounts of phosphorus compound in the polymer before the drying and determination of the amounts of phosphorus compound in the solid polymer, it is readily possible to adjust the amount of phosphorus compound remaining in the solid polymer. Adjustment of the amount of phosphorus is possible for instance by increasing the amount added before or during the washing step, by means of an addition directly prior to the squeezing or by means of the addition of phosphorus compound after squeezing, for instance as solid or as solution or dispersion, for example by spraying on.

The polymerization and optionally a physical and/or chemical post-treatment such as acidic hydrolysis, stripping, distillation, adsorption, post-treatment with reducing agent and/or antioxidant and the addition of phosphorus compound takes place expediently under a protective-gas atmosphere.

The polymer can—if desired—be converted to solid polymer, for example pourable polymer, by drying following polymerization and optional post-treatment. Drying methods are known to the skilled person.

The drying can take place, for example, by spray-drying, drum-drying or another warm-air or contact-heat drying. Drying by means of vacuum-drying or freeze-drying is also possible. All other methods for drying are in principle likewise suitable. Drying methods with spraying such as spray-drying and by means of contact surfaces such as drum drying are preferred drying methods.

However, it is also possible to dispense with the drying, for example if polymer solutions or dispersions are desired.

Protective-gas atmosphere is the term used to refer to the complete or partial replacement of air by protective gas (synonymous with "inert gas") such as, for example, nitrogen, helium, argon and/or carbon dioxide or mixtures thereof. A suitable protective gas is preferably nitrogen. Preferably, protective gas, in particular nitrogen, is used such that the oxygen content in the system is less than 50 000 ppm, preferably less than 20 000 ppm, particularly preferably less than 10 000 ppm and very particularly preferably less than 5000 ppm. Thus, for instance, an oxygen content of less than 1000 ppm or even less than 500 ppm can be achieved (ppm: based on gas volume; 5000 ppm correspond to 0.5% by volume).

In a preferred embodiment, the polymer is prepared under a nitrogen protective-gas atmosphere with less than 20 000 ppm, particularly preferably less than 5000 ppm, very particularly preferably less than 1000 ppm, of oxygen.

In a preferred embodiment, the post-polymerization, the physical, chemical or other post-treatment such as washing and/or the post-treatment with reducing agent and/or antioxidant and the addition of phosphorus compound takes place under a nitrogen protective-gas atmosphere with less than 20 000 ppm, particularly preferably less than 5000 ppm, very particularly preferably less than 1000 ppm, of oxygen, such as, for example, less than 500 ppm.

In order to avoid the renewed formation of peroxides due to oxygen during drying and consequently to achieve even lower peroxide contents, it is also advisable for drying to be carried out under protective gas, in particular under protective gas with a low residual oxygen content in the drying gas of, for example, less than 50 000 ppm, preferably less than 20 000 ppm, particularly preferably less than 10 000 ppm, very particularly preferably less than 5000 ppm and in particular less than 1000 ppm, such as less than 500 ppm.

Consequently, the drying according to the invention of low-peroxide polymer to give solid polymer, in particular of vinyllactam polymer such as water-insolubly crosslinked polyvinylpyrrolidone, preferably takes place by means of warm drying gas, in particular with protective gas such as nitrogen with a low residual oxygen content.

The stabilization method according to the invention takes place such that, in the sealed packaging form, the oxidation-sensitive, low-peroxide polymer, comprising at least one inorganic phosphorus compound in amounts such that the total phosphorus content per kilogram of polymer solid content of the finished polymer is $2*10^{-5}$ to 0.02 mol, is present under a protective gas atmosphere which has an oxygen content of less than 20 000 ppm, preferably less than 5000 ppm, particularly preferably less than 2000 ppm, very particularly preferably less than 1000 ppm and in particular less than 500 ppm.

Solid polymer is usually packaged directly after drying and optional subsequent sieving and/or screening steps in suitable packaging materials. Polymer solutions and dispersions are usually packaged directly in suitable packaging forms.

In principle, it is possible to use all packaging materials which are suitable and permissible for pharmaceutical, food or cosmetics applications or for the application desired in each case.

Materials which are of low permeability, or are virtually impermeable, for oxygen are advantageous as materials for packaging forms. By avoiding or minimizing polymer contact with oxygen during storage, the further oxidation of the polymer is again further reduced.

In addition, to carry out the polymerization and/or subsequent steps and/or a drying under protective gas, the packaging of the polymer can of course also additionally take place with nitrogen or noble-gas gassing or by means of vacuum application. Naturally, the sole use of inert packaging materials, such as in particular of materials and films which have little or virtually no permeability for oxygen also further improves the stability of the polymer against oxidation and peroxide build-up. Packaging under protective gas in such inert packaging materials naturally further improves the result.

Preferably, the polymer at the end of the stabilization method is present under a protective gas atmosphere in a sealed packaging form.

Suitable packaging materials and packaging methods are known, for example, from DE 202009000692 U1 and WO 2010052088 A1.

The present invention encompasses the use of the multilayer films for packaging forms disclosed in WO 2010052088 A1, the packaging forms disclosed therein, the outer packagings disclosed therein and also the packaging methods disclosed therein, disclosed on page 12, line 12 to page 25, line 14 and also the drawings 1 to 9 and their explanation on page 25, line 16 to page 28, line 7, the disclosure of which is hereby incorporated in its entirety. The cited specification discloses therein multilayer films with barrier layer properties which comprise barrier layers with regard to gas, in particular oxygen, permeability with specific maximum oxygen permeabilities and with specific maximum water vapor permeabilities. In addition, the layer structure and the production and the feed materials of such multilayer films used for this purpose is disclosed. Also disclosed are packaging forms made of these multilayer films, the forms such as side-gusset bag, hose and endless hose, properties of such packaging forms. Likewise disclosed are various options for closing such packagings. Furthermore disclosed are also the methods for filling polymers as powder, solution or dispersion into such packaging forms, especially under inert conditions. Outer packagings for such packaging forms are also disclosed. Drawings 1 to 9 show the structure of the multilayer films, of the packaging forms and of the outer packagings.

Within the context of this invention, the embodiments preferred in WO 2010052088 A1 are also the preferred embodiments of the multilayer films and the other feed materials for the films, the packaging forms and the packaging method, where, additionally within the context of this invention, aluminum instead of EVOH is also preferred as material for the barrier layer. Within the context of this invention, further preferred barrier layers are accordingly also the polyvinyl alcohol polymers disclosed therefor in WO 2010/072640 on page 14, lines 2 to 12, in particular the ethylene-vinyl alcohol polymers on page 14, lines 14 to 24.

If aluminum is used as barrier layer, then in principle the same procedure for preparation and use can be contemplated as disclosed in WO 2010052088 A1. Preference is given here to a layer structure made of at least three layers with the aluminum layer as the middle layer and two polymer layers, preferably water-repellent polymer layers, on both sides. It is also possible to use adhesive layers between polymer layer and aluminum layer, thus giving rise to a four-layered or five-layered film. Suitable polymers for these polymer layers on both sides of the barrier layer are in principle all polymers disclosed for this in WO 2010052088 A1 on page 13, lines 31 to 42. Preference is given to polymers selected from polyesters, polyamide, polyvinyl chloride, cellophane or polyolefins. Particular preference is given to polyolefins, very particularly preferably polyethylene and in particular the soft, relatively flexible film-suitable grades such as LDPE and LLDPE.

Suitable adhesive layers are preferably the polymers disclosed therefor in WO 2010052088 A1 on page 14, line 26 to page 15, line 12.

Preference is given to a five-layered film with the layer structure polyethylene/adhesive layer/aluminum/adhesive layer/polyethylene.

The use of two or more identical or different barrier layers in one laminate film is likewise possible. Thus, for example, one or more layers of aluminum and one or more layers of ethylene-vinyl alcohol polymer or combinations of those made of aluminum and ethylene-vinyl alcohol polymer can be used. In the case of two barrier layers, an at least seven-layered film then typically results, made of outer layer, adhesive layer, first barrier layer, adhesive layer, second barrier layer, adhesive layer and internal layer.

Particular preference is given to the use of multilayer films as endless hose as described in WO 2010052088 A1 on page 18, line 23, to page 19, line 3.

A further aspect of the present invention is the use of oxidation-sensitive, low-peroxide polymer in cosmetic or pharmaceutical preparations, preparations in the field of agriculture, beverages, food, animal feed, food supplementation or animal feed supplementation, and also for medical applications. The polymer can be used here as active ingredient or auxiliary. Allergic reactions or other incompatibilities, as can arise as a result of heavy metals or enzymes or sulfur compounds, are thereby avoided.

The polymer according to the invention has likewise proven advantageous for use in technology, for example medical technology such as dialysis membranes or other substances, equipment or apparatuses which come into contact with the body or body fluids or pass into the body or are introduced into the body. Likewise advantageous is the use in applications which are critical as regards color and/or odor, such as hair cosmetics, gels, displays, photoresists, adhesives or surface coating, for example for paper and transparent plastics.

Further possible applications are as auxiliary or active ingredient in the field of detergents and cleaners or technical applications such as membranes, gas hydrate inhibitors, ceramics, photoresists, gels, coatings, film coatings, displays, metal working and metal production.

Preference is given to the use in cosmetic or pharmaceutical preparations, preparations in the field of agriculture, beverages, foods, animal feeds, food supplementation or animal feed supplementation, and also for medical applications.

Particular preference is given to the use in cosmetic or pharmaceutical preparation. In particular, the use in pharmaceutical preparations has been found.

Oxidation-sensitive, low-peroxide vinyllactam polymer for pharmaceutical formulations such as solid dosage forms is particularly suitable.

Vinyllactam polymer preferred for such a use in pharmaceutical formulations is water-soluble and water-insolubly crosslinked vinylpyrrolidone polymer such as polyvinylpyrrolidone and PVPP and water-soluble vinylpyrrolidone-vinyl acetate polymer. Very particular preference is given to polyvinyl-pyrrolidone polymers. In particular, preference is given to water-insolubly crosslinked polyvinylpyrrolidone popcorn polymer.

Besides polymer according to the invention and optionally active ingredient, such formulations usually also comprise further auxiliaries customary and known to the skilled person such as binders, disintegration promoters, tablet disintegrants, surfactants, taste masking agents, lubricants, film coatings, fillers and/or sweeteners. All of these substances are in principle suitable for joint use with the polymer according to the invention.

In principle, all known active ingredients are suitable as active ingredients. Possible active ingredients are disclosed, for example, in US 2008-0181962 in paragraph [0071], from the seventh-last line to the end of this paragraph, to which reference is expressly made here. In principle, all fields of application are possible, for example those specified in US 2001-0010825 on page 1, paragraph [0029], last line, to paragraph [0074] end, and the examples of active ingredients specified therein, to which reference is likewise respectively expressly made here.

In view of the prior art, it was completely surprising that the use of phosphorus compound in such small amounts permits the preparation, packaging and storage in sealed, protective-gas-filled packaging forms and thus the provision of such a stabilized, low-peroxide polymer for the user which, even after storage for a long time and even in the event of short-term handling in air, has practically no measurable or only very low peroxide content.

By contrast, known polymers exhibit a considerable peroxide content even in the unopened original packaging which increases drastically and rapidly upon further storage and in particular upon contact with air.

According to this invention, accordingly, a very significant and in particular over a prolonged storage period—both in the closed original packaging form under protective gas atmosphere and also in the short term in air—a stable reduction in the peroxide contents was observed: Thus, no or only a marginal increase in the peroxide contents (compared to polymers not according to the invention) was observed starting from the original, already very low peroxide content of the polymers according to the invention which was determined after preparation. Surprisingly, an oxidation-sensitive, low-peroxide polymer obtainable by the process according to the invention also has a clearly measurable, but temporally limited stabilization against the rise in peroxide content during storage, even if the packaging materials are oxygen-permeable to a greater extent, if the packaging is not completely tight against the entry of oxygen—for instance in the case of damage to the packaging—and/or the polymer is located in an atmosphere with relatively high oxygen content of more than 2% by volume ranging to normal air and its known oxygen content.

The result of using the stabilization method according to the invention with the packaging of the polymer in the sealed, protective-gas-filled packaging forms can be yet further improved: thus, while carrying out process steps prior to bottling under a protective-gas atmosphere, in particular when carrying out drying under protective gas, the peroxide content measurable following preparation drops yet further compared with the preparation and handling, in particular drying without protective gas or with higher oxygen contents, and remains at a significantly lower level even during storage, thus shows no or only a very slowed increase in the peroxide values.

The present invention therefore in particular minimizes the peroxide content in the polymer and also improves stability upon thermal stress and stability in oxygen-containing medium.

This long-term effect was particularly surprising also without use of antioxidant: antioxidants are usually added to the polymers to be protected by a skilled person as protection against oxidation over a prolonged period. The effect from the sole use of an inorganic phosphorus compound, which as a skilled person is aware does not have an antioxidative effect, and what is more in such small amounts as in the present invention, was therefore completely unexpected.

One advantage of the low-peroxide polymer according to the invention is its stability, i.e. the properties such as peroxide content, molar mass, color and/or odor which it exhibits directly after preparation barely change over the course of time, if at all. The determination of the peroxide content in particular serves as a measure of the grade of the polymer. In addition, odor and/or color and—in the case of water-solubly crosslinked polymers—also molar mass, K value and viscosity of solutions can be used.

The peroxide content in the polymer, in particular vinyllactam polymer is determined here by means of iodometry, by means of titanyl sulfate reagent or by means of cerium reagent. The methods are known to the skilled person, for example from Ph. Eur. 7. All methods in principle produce comparable results.

Oxidation-sensitive, low-peroxide polymer according to the invention, in particular vinyllactam polymer such as polyvinylpyrrolidone polymers, according to the invention has here, in each case based on the polymer solids content, a peroxide content determined after preparation of not more than 20 ppm, preferably not more than 10 ppm and particularly preferably not more than 5 ppm, and/or a peroxide content determined at any desired time within up to three months after preparation of not more than 50 ppm, preferably not more than 30 ppm, particularly preferably not more than 10 ppm and very particularly preferably not more than 5 ppm, such as, for example, not more than 1 ppm, the peroxide content being determined by the titanyl sulfate method in accordance with European Pharmacopeia edition 7.

In particular, such a polymer according to the invention has residual monomer contents—based on the polymer solids content—of each monomer used of not more than 100 ppm, preferably not more than 50 ppm, particularly preferably not more than 20 ppm, very particularly preferably not more than 10 ppm and in particular not more than 5 ppm, such as, for example, less than 1 ppm.

The K value (Fikentscher K value; see for example Bühler, "Polyvinylpyrrolidone—Excipient for Pharmaceuticals", Springer, 2005, page 40 to 41) is a measure of the solution viscosity under defined conditions. Consequently, it is a direct measure of the molar mass. If the molar mass changes, for example as a result of oxidative processes, this leads to a build-up in molar mass (leads to K value increase) or to molar mass reduction (leads to K value decrease) and thus to a change in the K value.

The build-up and degradation of peroxides in the polymer is one such oxidative process. Consequently, polymer according to the invention and polymer obtainable by the process according to the invention also has a stability of the K value and thus of the molar mass upon storage. Since the molar mass and thus the K value are directly linked to the solution viscosity, the solution viscosity also consequently does not change or changes only to a very much lower extent than without the process according to the invention.

Polymer according to the invention and polymer obtainable by the process according to the invention exhibits, following storage at room temperature, a change in K value, determined at any desired time within 3 months following preparation, of usually less than 10%, preferably less than 5%, particularly preferably less than 2% and very particularly preferably less than 1%, based on the starting K value of the polymer, the starting K value being determined following preparation of the polymer in accordance with Fikentscher.

For insolubly crosslinked polymer—as a skilled person is aware—such a K value cannot be determined and is therefore also not stated.

The color of the polymer is important depending on the application and should usually be as slight as possible, preferably completely colorless. The color can be determined for example by means of spectroscopic methods and be stated for example as Hazen color number or iodine color number or as color classification according to the German Pharmacopeia. These determinations are familiar to the skilled person.

Oxidative processes during build-up and degradation of peroxides in the polymer also produce color-imparting components which change, usually impair, the color of the polymer, i.e. depending on the color scale, usually have significantly higher color values than previously.

As a result of the process according to the invention, the peroxide build-up is drastically reduced or even prevented and thus so too is the degradation. Consequently, changes in the color of the polymer are reduced or even completely prevented.

As a result, polymer according to the invention, in particular vinyllactam polymer, and polymer obtainable by the process according to the invention also achieves a stability in the color of the polymer upon storage.

Polymer according to the invention, in particular vinyllactam polymer, and polymer obtainable by the process according to the invention therefore exhibits, following storage at room temperature, a color number increase in the case of the Hazen color (also called "Hazen color number" or "cobalt platinum color number"), determined at any desired time within 3 months after preparation, of usually less than 10%, preferably less than 5%, particularly preferably less than 3% and very particularly preferably of 1% or less, based on the starting color value, which is determined after preparation.

The color according to Hazen is important only for soluble polymers and here in particular for cosmetic applications.

In the pharmaceutical sector, on the other hand, the color is determined in accordance with the requirements in the pharmacopeia and monographs. The color of the polymers according to the invention which can be achieved corresponds here to the requirements of all relevant provisions in Japan, USA and Europe in the most current version from 2010 and may even significantly surpass the requirements, i.e. have less of a color than required. These requirements and the relevant measurement methods are sufficiently known to the skilled person.

Polymer according to the invention, in particular vinyllactam polymer, and polymer obtainable by the process according to the invention therefore exhibits, following storage at room temperature, a color number increase for the color according to Ph. Eur. 7 determined at any desired time within 3 months after preparation, of usually less than 3 scale values, preferably less than 2 scale values, particularly preferably less than 1 scale value and very particularly preferably no deviation, based on the starting color value, which is determined after preparation.

The odor of the polymer is likewise important depending on the application. The polymer should not have a bad odor. Likewise, no bad odor should arise upon storage. The odor of the polymer can be determined for example by headspace GC method using odor profiles or by olfactory means, for example using the human nose (for instance by people trained for this purpose, such as perfumers). As a result of oxidative processes within the context of peroxide build-up and breakdown, not only are color-imparting substances formed, but also odor-forming substances which, for instance, lead to a "musty" odor.

Polymer according to the invention, in particular vinyllactam polymer, and polymer obtainable by the process according to the invention exhibits only a very reduced or virtually no change to undesired odors, determined at any desired time within 3 months after preparation.

The following examples illustrate the invention in an exemplary and nonlimiting manner.

EXAMPLES

The peroxide content was determined for all samples by the titanyl sulfate method as in European Pharmacopeia edition 7 (Ph. Eur. 7). The numbers stated refer to the ppm values (1 ppm corresponds to 1 mg of peroxide/kg of polymer), calculated and stated as hydrogen peroxide equivalent.

The content of phosphorus, sodium and potassium in the polymer was determined quantitatively by means of ICP-MS method (mass spectroscopy by means of inductively coupled plasma). Phosphinate, phosphonate and phosphate were determined quantitatively via ion chromatography.

Percentages are percent by weight. Data in "ppm" are based on the weight (1 ppm=1 mg/kg). Data in percent by weight and ppm refer in each case to solid polymer (the polymer solids content), i.e. the amount of polymer which is present in a solution or dispersion or suspension.

In all of the examples, the addition of phosphorus compound was carried out under nitrogen (nitrogen with a purity of 99.9% by volume was used). Further work-up such as drying and storage was likewise carried out under nitrogen of the same purity or where indicated under air.

Phosphorus compounds used:

The sodium and potassium salts of phosphonic acid (sodium or potassium phosphonates; obsolete name: phosphites), of diphosphonic acid (sodium diphosphonate) and also of phosphinic acid (sodium and potassium phosphinate) were used.

All of the films used satisfy the currently valid regulations of the German, European and US-American authorities and institutions relating to the packaging of pharmaceutical products, foods etc., such as the European Pharmacopeia, the rules of the US-American FDA or the German guidelines relating to packagings.

Packaging forms used:
Packaging forms/films according to the invention: 1, 2, 3
Comparison packaging forms/films: 4, 5, 6
Packaging form 1 (film 1), packaging form 2 (film 2):
Coextruded films in the form of a flexible, non-self-supporting film bag
Barrier layer: EVOH polymer, thickness 15 µm (+−3 µm tolerance)
Pressure-sensitive adhesive: maleic anhydride-modified polyethylene, Adoma SF 700, Mitsui Petrochemical Industries
EVOH: EVAL™ F (from Kuraray, Japan)
Polyethylene: LDPE The film bags with an antistatic finish on the outer side had the form of side-gusset bags. The hose covering was heat-sealed at the bottom (in the region from 10 to 20 mm above the lower hose edge).

Overall tolerance of the film thickness: +−8% (in accordance with DIN 53.370)

Packaging form 1:
Layer thickness: 150 µm thickness
Layer structure: polyethylene/adhesive layer/EVOH/adhesive layer/polyethylene
Layer thicknesses [µm]: 50/16.5/15/16.5/50 (product side)
Dimension: 950 mm long, 390 mm wide, 300 mm wide gusset, side-gusset bag Packaging form 2:
Layer thickness: 300 µm thickness
Layer structure: polyethylene/adhesive layer/EVOH/adhesive layer/polyethylene
Layer thicknesses [µm]: 145/10/15/10/120 (product side)
Dimension: 950 mm long, 390 mm wide, 300 mm wide gusset, side-gusset bag Packaging form 3 (film 3),
Laminated film in the form of a flexible, non-self-supporting film bag
Barrier layer: aluminum, thickness 15 µm (+−2 µm tolerance)
Pressure-sensitive adhesive: surface-modified polyethylene, Mitsui Petrochemical Industries
Polyethylene: LDPE The film bags with an antistatic finish on the outer side had the form of side-gusset bags. The hose covering was heat-sealed at the bottom (in the region from 10 to 20 mm above the lower hose edge).

Overall tolerance of the film thickness+−8% (in accordance with DIN 53.370)

Packaging form 3:
Layer thickness: 200 µm thickness
Layer structure: polyethylene/adhesive layer/aluminum/adhesive layer/polyethylene
Layer thicknesses [µm]: 100/10/15/10/65 (product side)
Dimension: 950 mm long, 390 mm wide, 300 mm wide gusset, side-gusset bag Packaging forms 4 and 5; aluminum-PE laminate films
General build-up principle:

The laminated layer (outer covering) consisted of aluminum/adhesive layer/polyester/adhesive layer/PE. The following internal layer of PE, which was in contact with the product, was a nonlaminated film (internal covering). This internal covering was inserted into the outer covering; both coverings were jointly heat-sealed at the bottom end (in the region from 10 to 20 mm above the lower hose edge). At the upper end of the hose edge, the two coverings were joined together by means of ten strips of an adhesive 10 to 15 cm in length spread at equal distances, executed in the direction from the lower hose edge to the upper hose edge. The firm bonding of both films at the upper hose end was carried out after pouring in the product by heat-sealing the bag at the upper hose end.

The film bags had the form of so-called side-gusset bags.

Packaging form 4: (film 4)
Layer thickness: 0.224 mm
Barrier layer: aluminum
Outer covering (outer film): layer structure: aluminum/adhesive layer/polyester/adhesive layer/PE
Layer thicknesses [µm]: 12/20/12/20/80
Inner covering (inner film): polyethylene: LDPE 80 µm (product side)
Adhesive layer: natural base
Dimension: 950 mm long, 390 mm wide, 300 mm wide gusset, side-gusset bag Packaging form 5: (film 5)
Layer thickness: 0.264 mm
Barrier layer: aluminum
Outer covering (outer film): layer structure: aluminum/adhesive layer/polyester/adhesive layer/PE
Layer thicknesses [µm]: 12/20/12/20/100
Inner covering (inner film): polyethylene: LDPE 100 µm (product side)
Adhesive layer: natural base
Dimension: 950 mm long, 385 mm wide, 300 mm wide gusset, side-gusset bag Packaging form 6: (film 6)
Polyethylene film, thickness 0.15 mm
Barrier layer: without
Layer structure: polyethylene
Layer thickness [µm]: 150
Polyethylene: HDPE
Dimension: 1000 mm long, 380 mm wide, 300 mm wide gusset, side-gusset bag Examples according to the invention:

Example 1 polyvinylpyrrolidone, K value 30, solid powder;
128.387 mg of sodium phosphonate (0.001235 mol of phosphorus) per kg of polymer Example 2 polyvinylpyrrolidone, K value 25, solid powder;
207.588 mg of potassium phosphonate (0.001729 mol of phosphorus) per kg of polymer

Example 3 polyvinylpyrrolidone, K value 90, solid powder;
468.630 mg of sodium diphosphonate (0.002985 mol of phosphorus) per kg of polymer

Example 4 polyvinylpyrrolidone (water-insolubly crosslinked; "PVPP", prepared from 1.99% by weight of crosslinker divinylethyleneurea and vinylpyrrolidone), solid powder;
172.048 mg of sodium phosphinate (0.002264 mol of phosphorus) per kg of polymer

Example 5 poly(vinylpyrrolidone-co-vinyl acetate), K value 38, weight ratio of vinylpyrrolidone to vinyl acetate=60:40; solid powder;
64.193 mg of sodium phosphonate (0.0006174 mol of phosphorus) per kg of polymer
69.506 mg of potassium phosphinate (0.0007546 mol of phosphorus) per kg of polymer
Total phosphorus content: 0.001372 mol of phosphorus per kg of polymer The polymers of examples 1 to 5 were polymerized by known processes (Examples 1 and 2: hydrogen peroxide as initiator, water as solvent, solid contents 40 and 45% by weight, respectively; Example 3: Wako V59 as initiator, water as solvent, solid content 23% by weight; example 5: di-tert-butyl perpivalate as initiator, isopropanol/water 90:10 as solvent; Example 4: prepared by means of popcorn polymerization in water from 2% by weight of divinylurea as crosslinker and 98% by weight of N-vinylpyrrolidone) and kept during all process steps of the polymerization via the washing (only Example 4) and drying up to the heat-sealing of the packaging form filled with polymer under a nitrogen protective-gas atmosphere with an oxygen content of less than 1% by volume.

After the end of the post-polymerization (Examples 2, 3 and 5) or after the post-polymerization and subsequent acidic hydrolysis with formic acid (Example 1) the polymers were admixed with the stated amount of the respective phosphorus compound(s) and stirred for 45 minutes in each case (polymer batch sizes: 8 cubic meters reactor volume).

In the case of Example 4, the phosphorus compound was added in an amount of 300 mg after the post-polymerization and stirred for 35 minutes (polymer batch size: 5 cubic meters reactor volume), then filtered, post-washed twice with phosphorus compound-containing water (500 mg per liter of washing solution) and filtered in each case and then the polymer was squeezed off. The amount of phosphorus compound was then determined in the wet polymer directly prior to drying and again after drying.

All packaging forms 1 to 5 were inserted into a paper carton as outer packaging, packaging form 6 was inserted into an HD-PE drum with tightened lid (elastomer seal in the inside edge), filled, evaporated and then gassed with nitrogen (99.8% by volume purity for Examples 1 to 5, 99% by volume purity for the comparative examples), heat-sealed and then stored in the cardbox or the drum closed with the lid under the stated storage conditions for the stated time. The number of packs stored corresponded to the envisaged measuring points: at each measuring point, a pack was then used which had never been opened since its filling up until the measurement in order to avoid contamination or falsification as a result of opening and reclosing.

Gas contents achieved in the packaging following preparation of Examples 1 to 5: nitrogen 99.7% by volume, oxygen less than 0.03% by volume.

Storage was carried out at 30° C. and 70% relative humidity and at 45° C. and 75% relative humidity. As comparison, samples were stored in aluminum-PE film bags also at 5° C.

The initial value of peroxides was determined after the filling and after storage after the number of months stated in each case. The peroxide content was determined by UV-photometric determination according to the titanyl sulfate method in accordance with European Pharmacopeia edition 7.

The tables below list the results in detail.
Abbreviations used:
n.d.=not determined
% r.h.=percent relative humidity

TABLE 1

Examples 1 to 5 according to the invention - results

| Example No. | Packaging form | Atmospheric humidity [% r.h.] | Temp. [° C.] | Storage period [months]: peroxides in ppm | | | | | | |
|---|---|---|---|---|---|---|---|---|---|---|
| | | | | 0 | 1 | 3 | 6 | 9 | 12 | 18 |
| 1a | 1 | 70 | 30 | <10 | <10 | <10 | <10 | <10 | n.d. | n.d. |
| 1b | 2 | 70 | 30 | <10 | <10 | <10 | n.d. | <10 | <10 | n.d. |
| 1c | 3 | 70 | 30 | <10 | <10 | <10 | n.d. | <10 | n.d. | <10 |
| 1d | 1 | 75 | 45 | <10 | <10 | <10 | <10 | 23 | n.d. | n.d. |
| 1e | 2 | 75 | 45 | <10 | <10 | <10 | n.d. | 20 | 34 | n.d. |
| 1f | 3 | 75 | 45 | <10 | <10 | <10 | n.d. | 17 | n.d. | n.d. |
| 2a | 1 | 75 | 45 | <10 | <10 | <10 | <10 | 20 | n.d. | 32 |
| 2b | 2 | 70 | 30 | <10 | <10 | <10 | n.d. | <10 | 21 | n.d. |
| 2c | 3 | 70 | 30 | <10 | <10 | <10 | n.d. | 19 | n.d. | n.d. |
| 3a | 1 | 75 | 45 | <10 | <10 | <10 | 14 | 11 | n.d. | 19 |
| 3b | 2 | 70 | 30 | <10 | <10 | <10 | n.d. | 13 | 21 | n.d. |
| 3c | 3 | 75 | 45 | <10 | <10 | <10 | n.d. | 18 | n.d. | 35 |
| 4a | 1 | 70 | 30 | <10 | <10 | <10 | <10 | <10 | n.d. | <10 |
| 4b | 2 | 70 | 30 | <10 | <10 | <10 | n.d. | <10 | <10 | n.d. |
| 4c | 3 | 75 | 45 | <10 | <10 | <10 | n.d. | 17 | n.d. | 22 |
| 5a | 1 | 70 | 30 | <10 | <10 | <10 | <10 | <10 | n.d. | <10 |
| 5b | 2 | 75 | 45 | <10 | <10 | <10 | n.d. | <10 | <10 | n.d. |
| 5c | 3 | 75 | 45 | <10 | <10 | <10 | n.d. | <10 | n.d. | <10 |

Example 3

Polyvinylpyrrolidone, K value 90, solid powder
Packaging form 2 (example 3b) and 3 (example 3c)

| Example No. | Storage period [months] at 30° C., 70% r.h.; K values [without unit] Months | | | | | |
|---|---|---|---|---|---|---|
| | 0 | 3 | 6 | 9 | 12 | 18 |
| 3b | 91.9 | 91.3 | n.d. | 91.5 | 91.0 | n.d. |

| | Storage period [months] at 45° C., 75% r.h.; K values [without unit] Months | | | | | |
|---|---|---|---|---|---|---|
| | 0 | 1 | 3 | 6 | 9 | 12 |
| 3c | 91.9 | 92.2 | 91.8 | n.d. | 92.0 | n.d. |

Analysis by Reference to Example 4

Determination of the contents 2 months after preparation produced these values:

Phosphorus content: 0.00224 mg per kg of polymer, sodium content: 0.0902 mg per kg of polymer Phosphinate and phosphate were able to be determined quantitatively. Phosphonate could only be determined qualitatively on account of the small amount.

Recovery of phosphorus: 100% within the scope of measurement accuracy

COMPARATIVE EXAMPLES

Comparative examples can be found in WO 2010052088 A1. All of the examples disclosed therein show the use of multilayer films for the packaging of polymers but without adding phosphorus compounds to the polymers, with otherwise identical multilayer films, identical packaging forms made of these multilayer films and identical packaging method. The only difference compared to the inventive embodiments of the present invention is the use of phosphorus compounds and also the strict handling with the exclusion of oxygen.

None of the examples disclosed in WO 2010052088 A1, either according to the invention or comparative examples, shows polymers with peroxide contents which are permanently lower than 20 ppm within a period of up to 6 months after preparation.

The films and packaging forms made of these films find the following equivalents in the present application and WO 2010052088 A1:

| WO 2010052088 A1 | Present application: |
|---|---|
| film 1/packaging form 1 | film 1/packaging form 1 |
| film 2/packaging form 2 | film 2/packaging form 2 |
| - no equivalent - | film 3/packaging form 3 |
| film 3/packaging form 3 | film 4/packaging form 4 |
| film 4/packaging form 4 | film 5/packaging form 5 |
| film 5/packaging form 5 | film 6/packaging form 6 |

By way of example, individual examples from WO 2010052088 A1 are given again here as comparative examples for the present invention. The example number stated in the first column of the tables corresponds to the number in WO 2010052088 A1:

Comparative Example 1

(corresponds to example 1 from WO 2010052088): polyvinylpyrrolidone, K value 30, solid powder; packaging form 2

| (Comparative) example No. | months | | | | | |
|---|---|---|---|---|---|---|
| | 0 | 1 | 3 | 6 | 9 | 12 |
| | Storage duration [months] at 30° C./70% r.h. | | | | | |
| 1 | 24 | | 54 | 40 | 39 | 31 |
| 2 | 37 | | 44 | 18 | 31 | 35 |
| 3 | 33 | | 80 | 29 | 38 | 39 |
| | Storage duration [months] at 45° C./75% r.h. | | | | | |
| 4 | 24 | 63 | 37 | 23 | 25 | 20 |
| 5 | 37 | 55 | 33 | 21 | 20 | 16 |
| 6 | 33 | 37 | 40 | 43 | 22 | 20 |

Packaging form 6 (corresponds to packaging form 5 of WO 2010052088)

| Comparative example No. | Storage duration [months] at 25° C., 60% r.h. peroxide contents in [ppm] months | | | |
|---|---|---|---|---|
| | 0 | 3 | 6 | 12 |
| 17 | 42 | 202 | 214.4 | 252 |
| 18 | 94 | 259 | 290 | 255 |
| 19 | 78 | 211 | 235 | 132 |
| 20 | 67 | 164 | 196 | 241 |
| 21 | 25 | 140 | 242 | 340 |
| 22 | 43 | 126 | 222 | 265 |
| 23 | 37 | 135 | 175 | 266 |

Comparative Example 2

(corresponds to example 2 from WO 2010052088): polyvinylpyrrolidone, K value 25, solid powder; packaging form 2

| (Comparative) example No. | months | | | | | |
|---|---|---|---|---|---|---|
| | 0 | 3 | 6 | 9 | 12 | 18 |
| | Storage duration [months] at 30° C./70% r.h.; peroxide contents in [ppm] | | | | | |
| 25 | 61 | 45 | <20 | 36 | 24 | 29 |
| | Storage duration [months] at 45° C./75% r.h.; peroxide contents in [ppm] | | | | | |
| 26 | 61 | 28 | 37 | 20 | <20 | n.d. |

Packaging form 4 (corresponds to packaging form 3 of WO 2010052088)

| (Comparative) example No. | months | | | | | |
|---|---|---|---|---|---|---|
| | 0 | 3 | 6 | 9 | 12 | 18 |
| | Storage duration [months] at 25° C., 65% r.h. peroxide contents in [ppm] | | | | | |
| 25 | 180 | 180 | n.d. | 190 | 166 | 227 |
| | Storage duration [months] at 45° C./75% r.h.; peroxide contents in [ppm] | | | | | |
| 26 | 180 | 170 | 170 | 170 | 239 | 140 |

Comparative Example 3

(corresponds to example 3 from WO 2010052088):
Polyvinylpyrrolidone, K value 90, solid powder: packaging form 2

| (Comparative) example No. | Storage duration [months] at 30° C., 70% r.h.; peroxide contents in [ppm] months | | | | | |
|---|---|---|---|---|---|---|
| | 0 | 3 | 6 | 9 | 12 | 18 |
| 27 | 69 | 74 | 53 | 54 | 47 | 42 |

| | Storage duration [months] at 45° C./75% r.h.; peroxide contents in [ppm] months | | | | | |
|---|---|---|---|---|---|---|
| | 0 | 1 | 3 | 6 | 9 | 12 |
| 28 | 69 | 59 | 60 | 41 | 39 | 31 |

| (Comparative) example No. | Storage duration [months] at 30° C., 70% r.h.; K values [without unit] months | | | | | |
|---|---|---|---|---|---|---|
| | 0 | 3 | 6 | 9 | 12 | 18 |
| 27 | 91.8 | 91.0 | 92.2 | 92.4 | 92.7 | 92.4 |

| | Storage duration [months] at 45° C./75% r.h.; K values [without unit] months | | | | | |
|---|---|---|---|---|---|---|
| | 0 | 1 | 3 | 6 | 9 | 12 |
| 28 | 91.8 | 92.0 | 91.6 | 92.1 | 92.5 | 92.1 |

Packaging form 5 (corresponds to packaging form 4 of WO 2010052088)

| (Comparative) example No. | Storage duration [months] at 5° C.; peroxide contents in [ppm] months | | | | | |
|---|---|---|---|---|---|---|
| | 0 | 3 | 6 | 9 | 12 | 18 |
| 29 | 107 | 127 | 150 | 100 | 103 | 100 |

| | Storage duration [months] at 25° C., 65% r.h.; peroxide contents in [ppm] months | | | | | |
|---|---|---|---|---|---|---|
| | 0 | 3 | 6 | 9 | 12 | 18 |
| 30 | 107 | 123 | 110 | 103 | 220 | 100 |

| | Storage duration [months] at 45° C., 75% r.h.; peroxide contents in [ppm] months | | | | | |
|---|---|---|---|---|---|---|
| | 0 | 2 | 3 | 6 | 9 | 12 |
| 31 | 107 | 90 | 157 | 290 | 73 | 53 |

| (Comparative) example No. | Storage duration [months] at 5° C.; K values [without units] months | | | | | |
|---|---|---|---|---|---|---|
| | 0 | 3 | 6 | 9 | 12 | 18 |
| 29 | 91.6 | 91.1 | 91.8 | 92.2 | 92.0 | 91.0 |

| | Storage duration [months] at 25° C., 65% r.h.; K values [without unit] months | | | | | |
|---|---|---|---|---|---|---|
| | 0 | 3 | 6 | 9 | 12 | 18 |
| 30 | 91.6 | 91.0 | 91.4 | 91.2 | 88.0 | 91.4 |

| | Storage duration [months] at 45° C., 75% r.h.; K values [without unit] months | | | | | |
|---|---|---|---|---|---|---|
| | 0 | 2 | 3 | 6 | 9 | 12 |
| 31 | 91.6 | 91.5 | 89.3 | 87.1 | 92.4 | 92.9 |

Comparative Example 4

(corresponds to example 8 from WO 2010052088):
Polyvinylpyrrolidone, water-insolubly crosslinked (popcorn polymer), solid powder
Packaging form 1

| (Comparative) example No. | months | | | | | |
|---|---|---|---|---|---|---|
| | 0 | 3 | 6 | 9 | 12 | 18 |
| | Storage duration [months] at 30° C., 75% r.h.; peroxide contents in [ppm] | | | | | |
| 46 | 36 | 45 | 54 | 60 | 37 | <20 |
| | Storage duration [months] at 45° C., 75% r.h.; peroxide content in [ppm] | | | | | |
| 47 | 36 | 68 | 72 | 53 | 31 | <20 |

Packaging form 4 (corresponds to packaging form 3 of WO 2010052088)

| (Comparative) example No. | months | | | | | |
|---|---|---|---|---|---|---|
| | 0 | 3 | 6 | 9 | 12 | 18 |
| | Storage duration [months] at 25° C., 65% r.h.; peroxide contents in [ppm] | | | | | |
| 48 | 56 | 102 | 135 | 173 | 186 | 214 |
| | Storage duration [months] at 45° C., 75% r.h.; peroxide contents in [ppm] | | | | | |
| 49 | 56 | 124 | 141 | 208 | 276 | 257 |

Comparative Example 5

(corresponds to example 9 from WO 2010052088):
Poly(vinylpyrrolidone-co-vinyl acetate), K value 38, weight ratio of vinylpyrrolidone to vinyl acetate=60:40; packaging form 2

| (Comparative) example No. | months | | | | | |
|---|---|---|---|---|---|---|
| | 0 | 3 | 6 | 9 | 12 | 18 |
| | Storage duration [months] at 30° C., 75% r.h.; peroxide contents in [ppm] | | | | | |
| 50 | 34 | 42 | 41 | 42 | 37 | <20 |
| | Storage duration [months] at 45° C., 75% r.h.; peroxide contents in [ppm] | | | | | |
| 51 | 34 | 58 | 65 | 60 | 28 | <20 |

Packaging form 4 (corresponds to packaging form 3 of WO 2010052088)

| (Comparative) example No. | months | | | | | |
|---|---|---|---|---|---|---|
| | 0 | 3 | 6 | 9 | 12 | 18 |
| | Storage duration [months] at 25° C., 65% r.h.; peroxide contents in [ppm] | | | | | |
| 52 | 54 | 72 | 89 | 104 | 138 | 169 |
| | Storage duration [months] at 45° C., 75% r.h.; peroxide contents in [ppm] | | | | | |
| 53 | 54 | 91 | 126 | 157 | 183 | 142 |

The invention claimed is:

1. A sealed, protective-gas-filled packaging comprising a composition consists of an oxidation-sensitive, low-peroxide polymer, at least one inorganic phosphorus compound, and optionally an antioxidant selected from the group consisting of ascorbic acid, erythorbic acid, alkali metal, alkaline earth metal, ammonium salts of these acids, derivatives thereof, and mixtures of these, the packaging comprising, per kilogram of polymer solid, the at least one inorganic phosphorus compound in amounts such that the total phosphorus content is $2\times10^{-5}$ to 0.02 mol.

2. The protective-gas-filled packaging according to claim 1, wherein the protective gas comprises less than 0.5% by volume of oxygen.

3. The protective-gas-filled packaging according to claim 1, wherein the inorganic phosphorus compound is selected from the group consisting of the oxo acids of phosphorus with phosphorus in oxidation states +1, +2, +3, +4 or mixed oxidation states, and salts thereof.

4. The protective-gas-filled packaging according to claim 3, wherein the oxidation state of phosphorus is +1 or +3.

5. The protective-gas-filled packaging according to claim 3, wherein the phosphorus compound is an alkali metal salt.

6. The protective-gas-filled packaging according to claim 1, selected from (i) homopolymers and copolymers of N-vinyl compounds, water-soluble and water-insolubly crosslinked homopolymers and copolymers of N-vinylpyrrolidone, N-vinylpyrrolidone-vinyl acetate copolymers, (ii) mixtures of two or more of these polymers or (iii) mixtures comprising one or more of these polymers.

7. The protective-gas-filled packaging according to claim 1, wherein the packaging form comprises at least one barrier layer.

8. The protective-gas-filled packaging according to claim 7, wherein the barrier layer is selected from the group consisting of aluminum and polyvinyl alcohol copolymers of ethylene and vinyl alcohol.

9. The protective-gas-filled packaging according to claim 1, wherein the packaging form comprises layers made of polyesters, polyamide, polyvinyl chloride, cellophane or polyolefins.

10. The protective-gas-filled packaging according to claim 1, wherein the packaging form consists of a composite film with at least three layers.

11. The protective-gas-filled packaging according to claim 7, wherein at least one water-repelling layer is applied to one or both sides of at least one barrier layer.

12. A method for stabilizing oxidation-sensitive polymer against peroxide formation, consisting of, during or after the polymerization, at least one inorganic phosphorus compound and optionally an antioxidant selected from the group consisting of ascorbic acid, erythorbic acid, alkali metal, alkaline earth metal, ammonium salts of these acids, derivatives thereof, and mixtures of these, the at least one inorganic phosphorus compound being added in one or more portions in amounts such that the total phosphorus content per kilogram of polymer solid content of the finished polymer is $2\times10^{-5}$ to 0.02 mol and the polymer treated in such a way is placed into a protective-gas-filled, sealed packaging form according to claim 1.

13. The method according to claim 12, wherein the protective gas comprises less than 0.5% by volume of oxygen.

14. The method according to claim 12, wherein the inorganic phosphorus compound is selected from the group consisting of the oxo acids of phosphorus with phosphorus of oxidation states +1, +2, +3, +4 or mixed oxidation states, and salts thereof.

15. The method according to claim 12, wherein the polymer is selected from (i) homopolymers and copolymers of N-vinyl compounds, water-soluble and water-insolubly crosslinked homopolymers and copolymers of N-vinylpyrrolidone, N-vinylpyrrolidone-vinyl acetate copolymers, (ii) mixtures of two or more of these polymers or (iii) mixtures comprising one or more of these polymers.

16. A process for preparing a cosmetic or pharmaceutical preparation, an agrochemical active ingredient, a food preparation, animal feed, food supplementation or animal feed supplementation or a medical application, comprising integrating the protective-gas-filled packaging according to claim 1 in cosmetic or pharmaceutical preparations, preparations of agrochemical active ingredients, preparations in the field of food, animal feed, food supplementation or animal feed supplementation, or in medical applications.

* * * * *